United States Patent
Ge et al.

(10) Patent No.: US 10,809,128 B2
(45) Date of Patent: Oct. 20, 2020

(54) GENERAL NOISE SUPPRESSION SCHEME WITH REFERENCE DETECTION IN OPTICAL HETERODYNE SPECTROSCOPY

(71) Applicant: THE REGENTS OF THE UNIVERSITY OF CALIFORNIA, Oakland, CA (US)

(72) Inventors: Nien-Hui Ge, Irvine, CA (US); Yuan Feng, Irvine, CA (US); Ilya Vinogradov, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/941,510

(22) Filed: Mar. 30, 2018

(65) Prior Publication Data
US 2018/0283950 A1 Oct. 4, 2018

Related U.S. Application Data

(60) Provisional application No. 62/479,744, filed on Mar. 31, 2017.

(51) Int. Cl.
| | |
|---|---|
| *G01J 3/45* | (2006.01) |
| *G01J 3/02* | (2006.01) |
| *G01J 9/04* | (2006.01) |
| *G01J 3/433* | (2006.01) |

(52) U.S. Cl.
CPC ............ *G01J 3/45* (2013.01); *G01J 3/027* (2013.01); *G01J 3/433* (2013.01); *G01J 9/04* (2013.01)

(58) Field of Classification Search
CPC ....... G01J 3/45; G01J 3/433; G01J 9/04; G01J 3/027
See application file for complete search history.

(56) References Cited

U.S. PATENT DOCUMENTS

| | | |
|---|---|---|
| 5,134,276 A | 7/1992 | Hobbs |
| 8,913,248 B2 | 12/2014 | Zeiss |

OTHER PUBLICATIONS

Black, A. J.; Akkin, T. Appl. Opt. 2015, 54, 7252.
Bo, E.; Liu, X.; Chen, S.; Yu, X.; Wang, X.; Liu, L. Opt. Express 2015, 23, 28050.
Abbas, G. L.; Chan, V. W. S.; Yee, T. K. Opt. Lett. 1983, 8, 419.
Mukamel, S. Principles of Nonlinear Optical Spectroscopy; Oxford University Press: Oxford, U.K., 1999.

(Continued)

*Primary Examiner* — Hwa Andrew Lee
(74) *Attorney, Agent, or Firm* — Shimokaji IP

(57) ABSTRACT

A heterodyne optical spectroscopy system comprises a light source that acts as a local oscillator (LO); a beam splitting component that generates a reference beam from the LO; a signal component that generates a sample signal from a sample; a beam blocker that can turn off the sample signal to generate blank shots; a composite signal detection subsystem that detects a heterodyned signal that is a mix of the sample signal and a portion of the LO; a composite reference detection subsystem synchronized to the signal detection subsystem to detect a portion of the reference beam; and a processor that processes digital signals from the signal detection subsystem and the reference detection subsystem. A very versatile reference scheme is developed to treat different heterodyne spectroscopies in a unified way, which achieves optimal noise suppression.

7 Claims, 15 Drawing Sheets

(56) References Cited

OTHER PUBLICATIONS

Röttger, K.; Wang, S.; Renth, F.; Bahrenburg, J.; Temps, F. Appl. Phys. B 2015, 118, 185.

Auböck, G.; Consani, C.; Monni, R.; Cannizzo, A.; Mourik, F. v.; Chergui, M. Rev. Sci. Instrum. 2012, 83, 093105.

Megerle, U.; Pugliesi, I.; Schriever, C.; Sailer, C. F.; Riedle, E. Appl. Phys. B 2009, 96, 215.

Polli, D.; Löer, L.; Cerullo, G. Rev. Sci. Instrum. 2007, 78, 103108.

Anderson, K. E. H.; Sewall, S. L.; Cooney, R. R.; Kambhampati, P. Rev. Sci. Instrum. 2007, 78, 073101.

Luther, B. M.; Tracy, K. M.; Gerrity, M.; Brown, S.; Krummel, A. T. Opt. Express 2016, 24, 4117.

Zhu, J.; Mathes, T.; Stahl, A. D.; Kennis, J. T. M.; Groot, M. L. Opt. Express 2012, 20, 10562.

Werley, C. A.; Teo, S. M.; Nelson, K. A. Rev. Sci. Instrum. 2011, 82, 123108.

Schriever, C.; Lochbrunner, S.; Riedle, E; Nesbitt, D. J. Rev. Sci. Instrum. 2008, 79, 013107.

Bizimana, L. A.; Brazard, J.; Carbery, W. P.; Gellen, T.; Turner, D. B. J. Chem. Phys. 2015, 143, 164203.

Brazard, J.; Bizimana, L. A.; Turner, D. B. Rev. Sci. Instrum. 2015, 86, 053106.

Dobryakov, A. L; Kovalenko, S. A.; Weigel, A.; Pérez-Lustres, J. L.; Lange, J.; Müller, A.; Ernsting, N. P. Rev. Sci. Instrum. 2010, 81, 113106.

Bradler, M.; Riedle, E. J. Opt. Soc. Am. B 2014, 31, 1465.

Hamm, P.; Wiemann, S.; Zurek, M.; Zinth, W. Opt. Lett. 1994, 19, 1642.

Kaucikas, M.; Barber, J.; Van Thor, J. J. Opt. Express 2013, 21, 8357.

Moon, S.; Kim, D. Y. Opt. Express 2007, 15, 15129.

Sul, S.; Karaiskaj, D.; Jiang, Y.; Ge, N.-H. J. of Phys. Chem. B 2006, 110, 19891.

Shim, S.-H.; Strasfeld, D. B.; Zanni, M. T. Opt. Express 2006, 14, 13120.

Moon, J. A. Rev. Sci. Instrum. 1993, 64, 1775.

Kanal, F.; Keiber, S.; Eck, R.; Brixner, T. Opt. Express 2014, 22, 16965.

Li, Y.-q.; Guzun, D.; Xiao, M. Phys. Rev. Lett. 1999, 82, 5225.

Wieser, W.; Draxinger, W.; Klein, T.; Karpf, S.; Pfeiffer, T.; Huber, R. Biomed. Opt. Express 2014, 5, 2963.

Holmes, J. F.; Rask, B. J. Appl. Opt. 1995, 34, 927.

Nee, M. J.; McCanne, R.; Kubarych, K. J.; Joffre, M. Opt. Lett. 2007, 32, 713.

Solli D. R.; Jalali, B. Nat. Photonics. 2008, 2, 48.

Goda, K.; Jalali, B. Nat. Photonics. 2013, 7, 102.

GENERAL NOISE SUPPRESSION SCHEME WITH REFERENCE DETECTION IN OPTICAL HETERODYNE SPECTROSCOPY

CROSS-REFERENCE TO RELATED APPLICATIONS

This application claims the benefit of and priority to U.S. provisional application No. 62/479,744, filed Mar. 31, 2017, which is incorporated herein in its entirety.

GOVERNMENT RIGHTS

This invention was made with Government support under Grant No. CHE1310693, awarded by the National Science Foundation. The Government has certain rights in this invention.

BACKGROUND OF THE INVENTION

The present invention generally relates to optical heterodyne spectroscopy and, more particularly, to apparatus and methods to reduce the effect of laser fluctuation in optical heterodyne spectroscopy.

Heterodyne detection is a very common technique used in many optical spectroscopies over a wide range of frequencies and samples. In heterodyne detection, a weak signal is mixed with a strong local oscillator (LO) and detected with a square-law photodetector. This is in contrast to direct detection where signal photons are directly detected with a photodetector.

Depending on the role of the LO, optical heterodyne spectroscopy can be divided into two classes, as depicted in FIGS. 1(A)-(B).

FIG. 1(A) is schematic of a self-heterodyned pump-probe setup. Beam 1 is from a broadband light source that is used both as a LO and a probe excitation beam for the sample. One or more excitation beams 2 that are amplitude/phase modulated also interact with the sample. The generated signal is self-heterodyned with the probe and detected by the detection system D1 that is usually composed of a spectrograph and an array detector.

FIG. 1(B) is a schematic of a heterodyned spectroscopy setup that uses an external LO. Beam 1 acts as a LO and is combined with a sample signal (Sig) via a beam splitter, BS2. The sample signal is generated by one or more excitation beams 2 that can be amplitude or phase modulated. The heterodyned sample signal can be detected by one or two detectors with a π phase shift between the sample signal and LO. When both D1 and D2 are used, the detection method is called balanced-heterodyne detection.

For both the pump-probe (FIG. 1(A)) and external local oscillator (FIG. 1(B)) setup, a portion of the LO can be split by a beam splitter, BS1, for reference detection. In general, the reference detection system, $D_{ref}$ is composed of either a single photodiode or a spectrograph and a detector array, which is identical to D1 (and D2 in the balanced-heterodyne case). $D_{ref}$ and D1/D2 must be carefully matched for conventional referencing methods to be effective The first class of optical heterodyne spectroscopy, shown in FIG. 1(A) as self-heterodyne spectroscopy, is where one excitation beam serves as the LO, and includes transient absorption/reflection, stimulated Raman scattering (SRS), electro-optic sampling and several other techniques. These techniques all employ some form of pump-probe configuration. Therefore, in the pump-probe case, we also name the LO beam as the probe beam. The other class of optical heterodyne spectroscopy, shown in FIG. 1(B), which uses an external LO which does not interact with the sample, includes heterodyne detected four-wave-mixing (FWM), sum-frequency generation (SFG) and other nonlinear spectroscopies. This class also includes some linear response techniques like optical coherence tomography (OCT). Although OCT is not terminologically a spectroscopy, the noise properties that are associated with heterodyne detection are similar.

Heterodyne detection can amplify a weak signal by a strong LO, and also has the benefit of preserving the signal phase information. However, the signal-to-noise ratio (SNR) advantage of heterodyne detection can often be severely deteriorated by the intensity fluctuations of a strong LO. Noise reduction is thus a critical issue in heterodyne spectroscopy.

Reference numbers in brackets below refer to one or more of the listed references at the end of this specification, each of which is incorporated herein by reference as fully set forth here. Previous works that have used reference detection for noise suppression in heterodyne spectroscopy can be divided into three classes depending on the types of detectors used. In the first class, both signal and reference detectors are photodiodes. Moon used analog-circuits to subtract the noise due to the probe beam in pump-probe spectroscopy. [1] These analog-balanced photodetectors are readily available off-the-shelf. In contrast, Nelson et al. [2] and Nesbitt et al. [3] digitized outputs from both photodiodes and used a ratiometric method in the digital domain to suppress noise. In the second class, the signal detector is an array whereas the reference detector is a photodiode. Turner et al. [4, 5] used the photodiode output to normalize the CCD output ratiometrically. They also discussed the convergence of different averaging methods. In the third class, both signal and reference detectors are arrays. These two arrays and respective spectrometer configuration need to be carefully matched for good performance. A ratiometric method is used in this case, across UV-visible [6, 7] to mid-IR [8, 9] wavelength range. In OCT, reference detection is seldom applied and appears to have been only applied to swept-source OCT (SS-OCT) detected by photodiodes. [10] For spectral-domain OCT (SD-OCT) using array detectors, only balanced heterodyne detection has been applied. [11, 12] In all three cases, it is difficult to achieve optimal noise reduction using the conventional methods. For noise suppression to be effective in conventional methods, the detectors ($D_{ref}$, D1, and D2 in FIG. 1) must be carefully pre-matched wherever possible. This procedure can be expensive and limits the versatility in detector choice.

Accordingly, there is a need for new apparatus and methods to further improve SNR in heterodyne spectroscopy, which are versatile for different techniques and detector choices.

SUMMARY OF THE INVENTION

In one aspect of the present invention, a heterodyne optical spectroscopy system comprises a light source that acts as a local oscillator (LO); a beam splitting component that generates a reference beam from the LO; a signal component that generates a sample signal from a sample; a beam blocker that can turn off the sample signal to generate blank shots; a composite signal detection subsystem that detects a heterodyned signal that is a mix of the sample signal and a portion of the LO; a composite reference detection subsystem synchronized to the signal detection subsystem to detect a portion of the reference beam; and a processor that processes digital signals from the signal detection subsystem and the reference detection subsystem.

In a further aspect of the present invention, a heterodyne optical spectroscopy system comprises a beam blocker that generates signal shots and blank shots of a sample signal; wherein the signal shots contain the sample signal and the blank shots do not contain the sample signal; a signal detection subsystem that detects the signal shots, the blank shots and a local oscillator (LO); a reference detection subsystem that detects the LO; and a controller in communication with the beam blocker, the signal detection subsystem, and the reference detection subsystem.

In an additional aspect of the present invention, a heterodyne optical spectroscopy system comprises a signal detection subsystem that detects a local oscillator (LO) and an intermittent sample signal; a reference detection subsystem that detects the LO; and a controller in communication with the signal detection subsystem, and the reference detection subsystem; wherein the controller is configured to remove, in two separate steps, two different noise components in the system.

In yet a further aspect of the present invention, a non-transitory computer readable medium with computer executable instructions stored thereon, executed by a processor, to perform a method for suppressing noise in a heterodyne optical spectroscopy system, the method comprises suppressing using blank shots, in two separate steps, convolutional noise and additive noise in the system; wherein the convolutional noise and the additive noise is from a local oscillator (LO) of the system.

In a still further aspect of the present invention, a computer-implemented method for removing noise in a heterodyne optical spectroscopy system comprises finding the relationship between two detection subsystems through blank shots; removing, by a processor, additive noise by a subtraction process and thereafter convolutional noise by a division process; wherein the additive noise is from a local oscillator (LO) of the system; and wherein the convolutional noise is from a pump beam in the system.

In another aspect of the present invention, a method of noise suppression in heterodyne spectroscopy comprises the steps of acquiring a plurality of shots on both the reference detection subsystem and the signal detection subsystem, of which a portion of the shots are blank shots; using the blank shots to find linear combination coefficients A and/or B that reconstruct the noise characteristics of the signal detection subsystems from the reference detection subsystems; and suppressing additive noise by subtraction for signal shots.

These and other features, aspects and advantages of the present invention will become better understood with reference to the following drawings, description and claims.

DETAILED DESCRIPTION OF THE INVENTION

Figure 1:
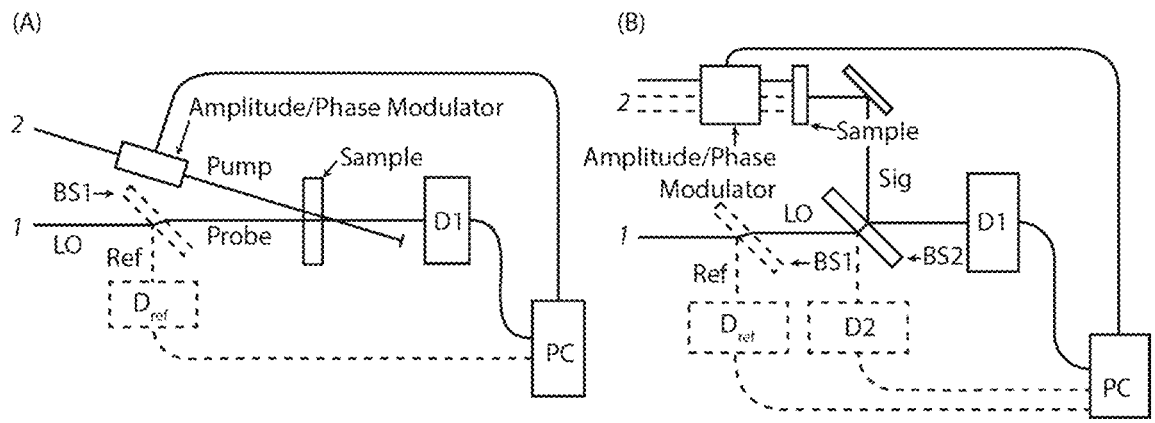
FIG. 1 is a schematic of optical heterodyne systems used in the prior art.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the present invention provides the apparatus and methods for noise suppression in heterodyne spectroscopy that treat different techniques in a unified way. Noise suppression with a second detector can be deployed in two ways: balanced heterodyne detection [13] where both detectors see the signal and LO, and reference detection where one detector only sees the LO. In this invention, we focus on reference detection because it can be more versatile than balanced heterodyne detection for different techniques. It is also easy to introduce a reference detector wherever balanced heterodyne detection is applicable.

According to the present invention, SNR of heterodyne spectroscopy is improved by a two-step scheme using reference detection. Different noise components are treated differently so that optimal noise suppression is achieved. It is based on the statistics of experimentally measured intensity fluctuation, and is thus inherently different from previous methods that apply some calibration curves calculated from the mean intensity. The present invention is mainly intended for techniques that use broadband light sources, such as femtosecond lasers, supercontinuum sources, and superluminescent diodes (SLD). These techniques often involve at least one pixelated array detector. The present invention can fully utilize the information from the array detectors for better noise suppression. The scheme works for single-pixel photodetectors too.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including a visual programming language such as LabView; an object oriented programming language such as Java, Smalltalk, C++; or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

1. General Analysis of Noises in Heterodyne Spectroscopy
   A. Additive and Convolutional Noises To illustrate the principle of the invention, FIG. 2 and FIG. 3 show pump-probe and heterodyne setups, respectively, according to embodiments of the present invention.

Figure 2:
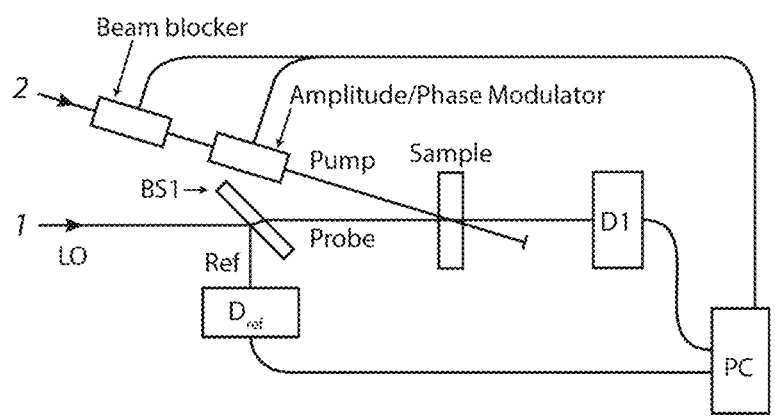
FIG. 2 is a schematic diagram of a pump-probe system according to an embodiment of the present invention.

FIG. 2 is a pump-probe setup with referencing Beam 1, which is from a broadband light source, and is first split by a beam splitter, BS1, into the probe (LO) beam and a reference beam, Ref. The reference beam is sent to a reference detection subsystem, $D_{ref}$. The digital signal is sent to a computer/controller/processor/memory, PC. The probe beam goes through a sample, where a pump beam interacts with the sample. The resulting probe beam is then sent to a detection subsystem, D1. The resulting digital signals are sent to PC. The pump beam 2 can be composed of one or more excitation beams that can be chopped or phase-cycled by an amplitude/phase modulator. The signal can also be turned off using a beam blocker to block the pump beam. This is used to collect blank shots for calculating coefficients A and B. Note that the beam blocker and amplitude/phase modulator can be the same physical device. The PC may control any one or more of the above components.

Figure 3:
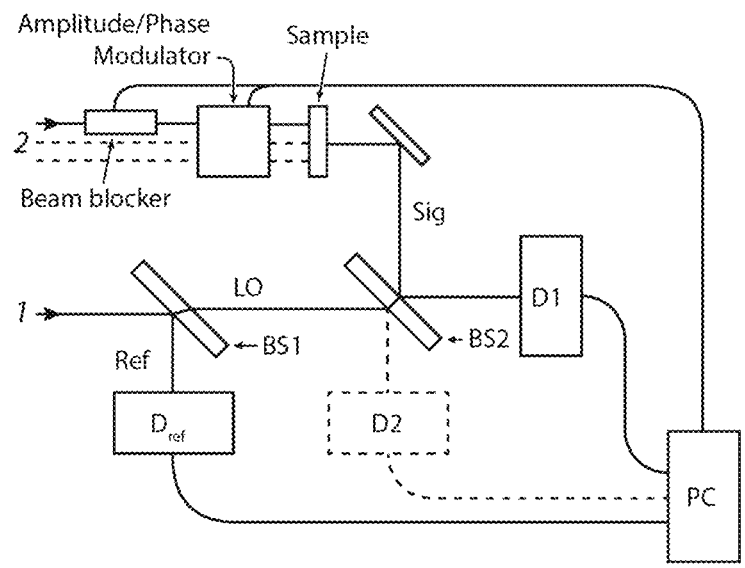
FIG. 3 is a schematic diagram of an optical heterodyne system according to an embodiment of the present invention.

FIG. 3 is a heterodyned setup with referencing Beam 1, which is from a broadband light source, and is first split by a beam splitter, BS1, into the local oscillator, LO, and a reference beam, Ref. The reference beam is sent to a reference detection system, $D_{ref}$. The digital signal is sent to a computer/controller/processor/memory, PC. The local oscillator is then combined with a signal beam (Sig) via beam splitter, BS2. The heterodyned signal is then detected by D1 or/and D2 and the resulting digital signals are sent to PC for digital processing. When both D1 and D2 are used, the detection method is called balanced-heterodyne detection. Beams 2 are one or more excitation beams used to generate the sample signal from a sample. The signal from the sample can be chopped or phase-cycled by an amplitude/phase modulator before (by inserting into the excitation beams) or after the sample. The signal can also be turned off using a beam blocker to collect blank shots for calculating coefficients A and B. Note that the beam blocker and amplitude/phase modulator can be the same physical device. The PC may control any one or more of the above components.

We give a general analysis of noises in heterodyne spectroscopy using the following notation to describe different physical quantities. E and I denote the electric field and intensity of a beam, respectively. They are real-valued random variables that represent any single measurement event and can be implicit functions of wavelength (when measured by a detector array). A measurement event is considered as a single readout cycle of the detectors, which we refer to as a "shot" throughout the invention. Note that the data generated from a shot includes the data generated from both the signal and reference detectors. For a pulsed light source like femtosecond lasers, the shot of the detectors should be synchronized to the laser pulses. The subscript denotes which beam: LO is the local oscillator entering the signal detector, Sig is the sample signal, Pu is the pump beam, Ref is the reference beam, and $I_{tot}$ is the total intensity on the signal detector (including LO and sample signal). Specifically, $I_{Ref}$ can be referred to as the reference data. Both the sample signal and local oscillator are incident on the signal detector, and they are not separable in the self-heterodyne techniques. The total intensity on the signal detector, $I_{tot}$, is:

$$I_{tot}=(E_{LO}+E_{Sig})^2=I_{LO}+I_{Sig}+2E_{LO}E_{Sig} \quad (1)$$

We assume that $I_{LO}$ is much stronger than $I_{Sig}$ throughout this invention, and therefore we will ignore $I_{Sig}$ later. The interference term $2E_{Lo}E_{sig}$ contains the sample response we want to extract from heterodyne detection. The exact expression for $E_{sig}$ depends on the specific techniques employed, but in general it is proportional to the electric fields of all the excitation beams and the sample response. [14] For the sake of simplicity, we will focus on pump-probe, although our methodology is equally applicable to other techniques. In pump-probe, $2E_{LO}E_{Sig} \stackrel{\text{def}}{=} \chi^{(3)}I_{LO}I_{Pu}$ with $\chi^{(3)}$ being the third-order susceptibility.

We further define $\bar{I} \stackrel{\text{def}}{=} \langle I \rangle$ and $\Delta I \stackrel{\text{def}}{=} I-\bar{I}$. Here the brackets indicate the expected (mean) value of a random variable and the δ prefix indicates the deviation of a random variable from its expected value. In heterodyne nonlinear spectroscopy, usually chopping or phase-cycling are used to remove the strong $I_{LO}$ background. In both cases, we use the superscripts * and ' to denote the two shots in a pair of consecutive shots, and define $\Delta I \stackrel{\text{def}}{=} I^*-I'=\delta I$ as the intensity difference between them (later we will extend this definition for a more general case in section 5D). δI and ΔI are related by the variance: $\text{var}(\Delta I)=2(1-r)\cdot\text{var}(\delta I)$ where $r \stackrel{\text{def}}{=} \text{corr}(I^*, I')$ is the consecutive shot correlation coefficient. With chopping, * refers to pump-on whereas ' refers to pump-off, and we obtain:

$$\Delta I_{tot}=(E^*_{LO}+E^*_{Sig})^2-(E'_{LO})^2 \approx \Delta I_{LO}+\chi^{(3)}I^*_{LO}I^*_{Pu} \quad (2)$$

With phase-cycling, * refers to zero-phase shift whereas ' refers to π-phase shift, and we obtain:

$$\Delta I_{tot}=(E^*_{LO}+E^*_{Sig})^2-(E'_{LO}-E'_{Sig})^2 \approx \Delta I_{LO}+\chi^{(3)}(I^*_{LO}I^*_{Pu}+I'_{LO}I'_{Pu}) \quad (3)$$

In a perfect world where no noise exists, $\Delta I_{LO}=0$ and $I^*_{LO}I^*_{Pu}=I'_{LO}I'_{Pu}\cdot\Delta I_{tot}$ in Eq. (2) and (3) contains only the signal terms. In the real world, both terms contribute to the total noise: the $\Delta I_{LO}$ term is independent of the sample response $\chi^{(3)}$, and thus it is additive; the second term is multiplied by $\chi^{(3)}$, and thus it is convolutional (or multiplicative). The two types of noise need to be removed separately. Terms like $I_{LO}I_{Pu}$ can be decomposed into:

$$I_{LO}I_{Pu} = \bar{I}_{LO}\bar{I}_{Pu}\left(1+\frac{\delta I_{LO}}{\bar{I}_{LO}}\right)\left(1+\frac{\delta I_{Pu}}{\bar{I}_{Pu}}\right) \quad (4)$$

This means that the convolutional noise is related to δI of multiple beams, in contrast to the additive noise $\Delta I_{LO}$ which is only related to the fluctuation in LO. In many systems of interest where the sample signal is very weak, the additive noise is much larger than the convolutional noise. To see this, we can rearrange Eq. (3) and (4) into:

$$\frac{\Delta I_{tot}}{\bar{I}_{LO}} = \overline{\Delta OD_e} + \frac{\Delta I_{LO}}{\bar{I}_{LO}} + \overline{\Delta OD_e}\left(\frac{\delta I^*_{LO}}{\bar{I}_{LO}}+\frac{\delta I^*_{Pu}}{\bar{I}_{Pu}}+\frac{\delta I^*_{LO}}{\bar{I}_{LO}}\frac{\delta I^*_{Pu}}{\bar{I}_{Pu}}\right) \quad (5)$$

where $\overline{\Delta OD_e} \stackrel{\text{def}}{=} \chi^{(3)}\bar{I}_{Pu}$ is the expected value of absorbance change (in e-base) induced by the pump beam. $\overline{\Delta OD_e}$ is often below 0.01, and can be even lower than $10^{-5}$. The second term on the right-hand side of Eq. (5) is the additive noise, and the third term is the convolutional noise. For typical lasers, RMS values of $\Delta I_{LO}/\bar{I}_{LO}$, $\delta I^*_{LO}/\bar{I}_{LO}$ and $\delta I^*_{Pu}/\bar{I}_{Pu}$ are on the order of 0.2%-2%. [3, 6, 9, 15-20] This means that the additive noise is not only orders of magnitude larger than the convolutional noise, [17] but it also can be larger than $\overline{\Delta OD_e}$. Therefore, it is most critical to suppress the dominant additive noise.

B. Characteristics of Laser Fluctuations

To demonstrate the noise statistics and their suppression, we collected data with our pump-probe 2D IR setup. The schematic of the setup is shown in FIG. 4.

Figure 4:
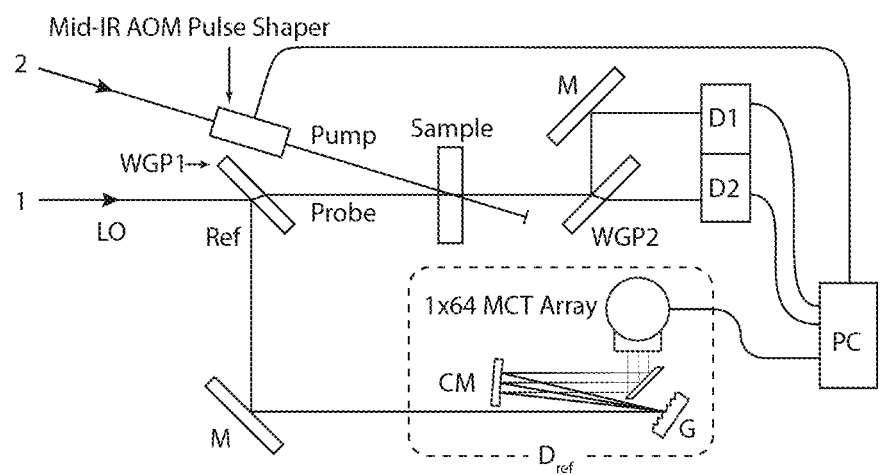
FIG. 4 is a schematic diagram of a 2DIR pump-probe setup used to collect data according to an embodiment of the present invention.

FIG. 4 is a variant of the schematic shown in FIG. 2. Both beams 1 and 2 are derived from an optical parametric amplifier and generated via difference frequency generation (OPA/DFG) (not shown). A portion of the OPA/DFG output is split to generate beam 1. Beam 1 has an additional delay line (not shown). Beam 1 is split by WGP1, a wire grid polarizer, which acts as a polarizing beam splitter to split a small portion of the LO to generate the first reference beam, Ref. Ref is sent to the composite reference detection subsystem $D_{ref}$. $D_{ref}$ is composed of several components. Optical components include only a grating, G, to disperse Ref and a concave mirror, CM, to focus the dispersed Ref, and a steering mirror to direct the focused and dispersed Ref onto a 1×64 MCT array detector. The array and its associated electronics (which are all part of $D_{ref}$) generate digital signals that are sent to the computer, PC. After WGP1, the leftover LO, also called the probe, continues to interact with the sample. Beam 2, which is the remainder of the OPA/DFG output, goes through a mid-IR AOM pulse shaper, which acts both as an amplitude/phase modulator and a beam blocker to generate blank shots. The outgoing beam 2 becomes the pump beam, which continues to interact with the sample. After the sample interaction, the remaining pump beam is dumped. The sample signal and LO (probe) are self-heterodyned and become equally split by WGP2. The two resulting beams are sent to the composite detection subsystems D1 and D2. D1 and D2 correspond to the top and bottom arrays of a 2×32 MCT array detector, which sends digital signals to PC/controller/processor/memory. D1 and D2 share the same physical optical components, mainly a commercial spectrograph and associated steering optics. Therefore, D1 and D2 are matched detectors that are unmatched to $D_{ref}$. Throughout the description of the invention, D1 acts as a signal detection subsystem and D2 acts as a reference detection subsystem when the pump is off, although their real purpose is to act as a composite signal detection subsystem to detect different signal polarizations. The PC may control one or more of the above components.

Using the setup in FIG. 4, ultrafast mid-IR pulses were generated at 1 KHz by an 800-nm pumped OPA/DFG source, [21] and centered at ~6 μm with FWHM~150 cm$^{-1}$. The mid-IR beam is split into two: the first beam serves as the source for the LO (probe) and reference beams, and the second beam goes through an acousto-optic modulator (AOM) and acts as the pump beam. [22] The experimental setup was purged to remove atmospheric absorption. Except for FIG. 14(A) and FIG. 24, all mid-IR data were collected by a liquid nitrogen (LN2) cooled 2×32-pixel mercury cadmium telluride (MCT) array behind a commercial spectrograph. The top row is designated as the signal detector, and the bottom row as the reference detector. All data for noise analysis were collected with pump off except for FIG. 10.

Figure 5:
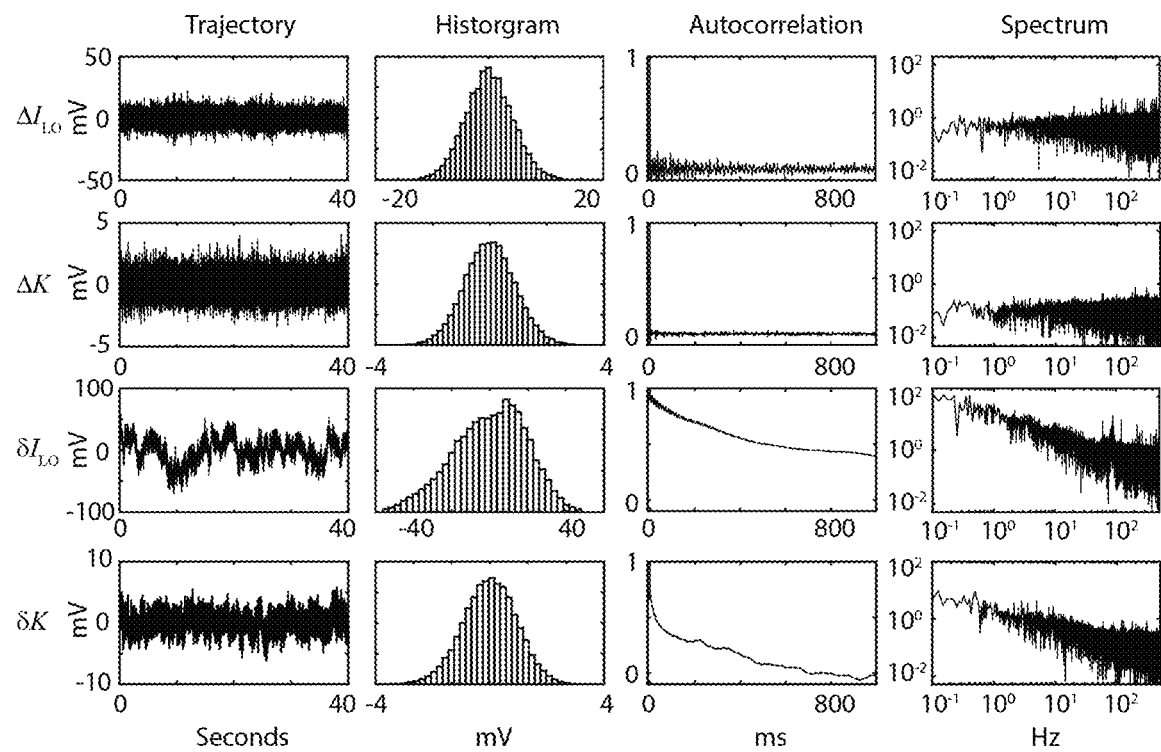
FIG. 5 are plots of statistics for $\Delta I$ and $\delta I$ noises before and after multi-channel referencing according to embodiments of the present invention.

FIG. 5 shows statistical properties of noise before and after multi-channel referencing. The four rows are $\Delta I_{LO}$, $\Delta K$, $\delta I_{LO}$, and $\delta K$ (see Sections 1A and 2B herein) from top to bottom. The four columns are the time trajectories, histograms, autocorrelations, and amplitude spectra from left to right.

The first two rows in FIG. 5 show the laser statistical properties taken from the central pixel of the signal array over a 40-second trajectory. $\delta I_{LO}$ has 40K data points whereas $\Delta I_{LO}$ has 20K data points because $\Delta I$ is defined for a pair of consecutive shots. $\delta I_{LO}$ has fluctuations typical for many ultrafast lasers [2, 3, 5, 7, 18, 19, 23, 24] and the histogram shows deviations from a Gaussian distribution. The amplitude spectrum is dominated by 1/f-noise at low frequencies. In contrast, the amplitude spectrum for $\Delta I_{LO}$ is almost flat and resembles white noise across the entire frequency range. Its histogram is also very close to a Gaussian distribution. The autocorrelation of $\Delta I_{LO}$ exhibits a sharp drop after zero lag followed by small oscillations, which is very different from the decay seen in the autocorrelation of $\delta I_{LO}$. We repeated the measurements under many conditions with different 800-nm pump laser intensity/stability and OPA/DFG parameters, and found that the basic features of $\Delta I_{LO}$ are always stable whereas the behavior of $\delta I_{LO}$ can vary widely. For example, FIG. 5 shows a dataset where the autocorrelation of $\delta I_{LO}$ decreases very slowly, but it is not always so slow. The operation of chopping and taking the intensity difference between two consecutive shots to obtain $\delta I_{LO}$ is similar to applying a high-pass filter, which removes the low-frequency noise that dominates the $\delta I_{LO}$ spectrum. Another difference between $\Delta I_{LO}$ and $\delta I_{LO}$ is that they have different correlation coefficients between the corresponding signal and reference pixels, as shown in FIG. 17(D) where the crosses are for corr($\Delta I_{LO}$, $\Delta I_{Ref}$), and circles are for corr($\delta I_{LO}$, $\delta I_{Ref}$). We typically find that corr($\Delta I_{LO}$, $\Delta I_{Ref}$) is higher than corr($\delta I_{LO}$, $\delta I_{Ref}$) in our system. Without fully accounting for the distinctive statistical properties of $\Delta I_{LO}$, the additive noise cannot be optimally suppressed.

C. Total Noise and Detector Noise

Before presenting our noise suppression scheme, we will discuss different noise sources. The additive noise $\Delta I_{LO}$ can be decomposed as:

$$\sigma(\Delta I_{LO}) \propto \sqrt{2(N_{LO}+N_r^2+D\cdot t)+(N_{LO}\cdot p_2)^2} \quad (6)$$

where σ means standard deviation throughout this disclosure. $N_r$ is the readout noise (including all electronic and digitization noise). $(D\cdot t)^{1/2}$ is the dark noise with D being the dark current and t being the integration time. $(N_{LO})^{1/2}$ is the photon shot noise from the LO (except for amplitude-squeezed light [25]). All three noise terms are counted by the number of electrons. Ideally, they are uncorrelated with one another. $(N_{LO}+N_r^2+D\cdot t)^{1/2}$ is the noise floor, and $(N_r^2+D\cdot t)^{1/2}$ is the detector noise which can be measured by blocking the light. The factor of 2 before the parentheses in Eq. (6) accounts for the fact that $\Delta I$ is defined for a pair of consecutive shots, but is not included when reporting the detector SNR. For our dual-row MCT array, the full-well capacity is ~$10^9$ electrons in the linear response range, and the best dynamic range is ~2800 (although the detector noise level of MCT detectors drifts frequently). This gives an estimated $(N_r^2+D\cdot t)^{1/2}$ ~ 3.6×$10^5$ electrons which is more than 11 times the maximal $(N_{LO})^{1/2}$ possible, making photon shot noise negligible. Therefore, the SNR of MCT detectors is limited by the detector noise. The SNR may be limited by photon shot noise for other types of detectors, especially for many sensitive CCD and CMOS arrays. The $(N_{LO}\cdot p_2)$ term represents the contribution of LO intensity fluctuation with $p_2$ being a measure of the fractional intensity change between two consecutive shots, and it is the only referenceable common-mode noise shared by both the signal and reference detectors. Because the $(N_{LO}\cdot p_2)^2$ term is quadratically scaled with $N_{LO}$, it can dominate and severely degrade the SNR of heterodyne detection when the LO intensity is high. For detectors with large well depths, it is beneficial to work with a high LO intensity to exploit the high detector SNR [9, 17, 18], and thus good noise suppression is especially needed for this case.

2. Suppression of Additive $\Delta I_{LO}$ Noise

A. Arbitrary Single-Reference-Channel Method

We begin with an arbitrary single-reference-channel method where each signal channel is referenced by only one reference channel. We use the terms "channel" and "pixel" interchangeably and depending on context. Here "arbitrary" means that this can be one photodiode referenced by another photodiode, an array pixel referenced by a photodiode, or an array pixel referenced by another array pixel. To our best knowledge, this already generalizes the referencing methods previously covered in the literature.

First, we propose an extended ratiometric method that introduces two free parameters $d_{LO}$ and $d_{Ref}$ as an ansatz, and define $k_{LO} \stackrel{\text{def}}{=} I_{LO}+d_{LO}$, $k_{Ref} \stackrel{\text{def}}{=} I_{REF}+d_{Ref}$.

$$J \stackrel{def}{=} \frac{(\bar{I}_{LO} + d_{LO}) + \delta I_{LO}}{(\bar{I}_{Ref} + d_{Ref}) + \delta I_{Ref}} (\bar{I}_{Ref} + d_{Ref}) \approx k_{LO} + \left(\delta I_{LO} - \frac{k_{LO}}{k_{Ref}} \cdot \delta I_{Ref}\right) \quad (7)$$

When $d_{LO} = d_{Ref} = 0$, Eq. (7) reduces to the conventional ratiometric method and J becomes the LO intensity after referencing. In the approximation of Eq. (7), we assume $\delta I_{Ref}/k_{Ref} \ll 1$. In the case of conventional ratiometric method, this approximation requires that the relative intensity fluctuation $\delta I_{Ref}/\bar{I}_{Ref}$ is small. However, we will show below that this approximation can always be justified by choosing appropriate values for $d_{LO}$ and $d_{Ref}$ in our extended ratiometric method. Now taking the difference between a pair of consecutive shots:

$$\Delta J = J^+ - J' = \Delta I_{LO} - \frac{k_{LO}}{k_{Ref}} \cdot \Delta I_{Ref} \quad (8)$$

$\Delta J$ can be considered as residual $\Delta I_{LO}$ noise after referencing, and needs to be minimized with respect to the free parameters. Because the expected values of both $\Delta I_{LO}$ and $\Delta I_{Ref}$ are zero, the expected value of $\Delta J$ is also zero for any value of $k_{LO}/k_{Ref}$. To minimize a random variable with a zero mean, we just need to minimize its variance with respective to the free parameters:

$$\frac{\partial \text{var}(\Delta J)}{\partial k_{Ref}} = 0 \quad (9)$$

$$\frac{\partial \text{var}(\Delta J)}{\partial k_{LO}} = 0$$

Both equations yield the same result:

$$\frac{k_{LO}}{k_{Ref}} = \frac{\text{cov}(\Delta I_{LO}, \Delta I_{Ref})}{\text{var}(\Delta I_{Ref})} = R \cdot \frac{\sigma(\Delta I_{LO})}{\sigma(\Delta I_{Ref})} \quad (10)$$

where $\text{cov}(\Delta I_{LO}, \Delta I_{Ref})$ is the covariance and $R = \text{corr}(\Delta I_{LO}, \Delta I_{Ref})$ is the correlation coefficient between $\Delta I_{LO}$ and $\Delta I_{Ref}$. The minimized residual noise is:

$$\text{var}_{min}(\Delta J) = (1 - R^2) \cdot \text{var}(\Delta I_{LO}) \quad (11)$$

Because Eq. (10) only imposes a constraint on the ratio, we can adjust $d_{LO}$ and $d_{Ref}$ while keeping $k_{LO}/k_{Ref}$ constant without changing the result in Eq. (11). In fact, $d_{LO}$ and $d_{Ref}$ can be set to be arbitrarily large so that $\delta I_{Ref}/k_{Ref} \ll 1$ is always justified for Eq. (7).

Next, we propose an extended subtraction method which introduces one free parameter b as an ansatz:

$$K \stackrel{def}{=} I_{LO} - b \cdot I_{Ref} \quad (12)$$

When $b = \bar{I}_{LO}/\bar{I}_{Ref}$, Eq. (12) reduces to the conventional subtraction method and K can be considered as the differential output of analog-balanced photodetectors. Now taking the difference between a pair of consecutive shots:

$$\Delta K = \Delta I_{LO} - b \cdot \Delta I_{Ref} \quad (13)$$

$\Delta K$ is the residual noise after referencing, and it is also zero mean for any value of b. Minimizing the variance of $\Delta K$ with respect to b yields similar results to Eq. (10) and (11):

$$b = \frac{\text{cov}(\Delta I_{LO}, \Delta I_{Ref})}{\text{var}(\Delta I_{Ref})} = R \cdot \frac{\sigma(\Delta I_{LO})}{\sigma(\Delta I_{Ref})} \quad (14)$$

$$\text{var}_{min}(\Delta K) = (1 - R^2) \cdot \text{var}(\Delta I_{LO}) \quad (15)$$

This is not surprising given the similarity between Eq. (8) and Eq. (13). When both are minimized, $\Delta K$ is exactly the same as $\Delta J$ (in the very large $k_{LO}$ and $k_{Ref}$ limit) although K and J are different. Intuitively, b or $k_{LO}/k_{Ref}$ optimally scales the reference channel $\Delta I$ fluctuations to the signal channel $\Delta I$ fluctuations when either parameter is found by simple linear regression. In the subsequent sections we will focus on the extended subtraction method.

In our method, the effects of uncorrelated noises are explicitly considered because b is calculated from $\text{cov}(\Delta I_{LO}, \Delta I_{Ref})$ and $\text{var}(\Delta I_{Ref})$ rather than mean intensities $\bar{I}_{LO}$ and $\bar{I}_{Ref}$ which average out the noises. This guarantees that our method always suppresses the noise more effectively than the conventional methods. To demonstrate this intuitively, consider a case where perfectly matched signal and reference detectors detect the same light intensities so that $I_{LO} = I_{Ref}$ and $\text{var}(\Delta I_{LO}) = \text{var}(\Delta I_{Ref})$. With conventional methods, taking the variance of Eq. (13) and (8) under the condition of $b = 1$ and $k_{LO}/k_{Ref} = 1$, respectively, leads to $\text{var}(\Delta K) = \text{var}(\Delta J) = 2(1 - R)\text{var}(\Delta I_{LO})$. From Eq. (6), R is always less than 1 due to the presence of uncorrelated noises, which leads to $(1 - R^2) < 2(1 - R)$. This means that the residual noise in our method is always lower than that of conventional methods. Sometimes the $(N_{LO} \cdot p_2)^2$ term in Eq. (6) is so small that the uncorrelated detector noises constitute a major noise source for $\sigma(\Delta I_{LO})$ and R is well below 1. This occurs when the laser is stable or the light intensity is weak. When $R < 0.5$, the conventional methods will increase the noise level after referencing. In contrast, our method always reduces noise even for anti-correlation, which is guaranteed by the non-negative $R^2$. The above comparison considers the best-case scenario in the conventional methods. In more realistic situations where two detectors cannot be perfectly matched, the conventional methods will perform even worse.

Moreover, by treating the statistics of $\Delta I_{LO}$ directly, the referencing performance in Eq. (15) does not explicitly contain the consecutive shot correlation r. Another important feature is that because of the linear form in Eq. (13) and $\langle \Delta I_{LO} \rangle = \langle \Delta I_{Ref} \rangle = 0$, our method does not introduce any baseline shift or signal distortion even when the light intensity fluctuates a lot.

The conventional subtraction method is already widely used in heterodyne spectroscopies with two analog-balanced photodiodes and lock-in amplifiers, especially in experiments involving high-repetition rate MHz lasers. However, our method does subtraction digitally in a computer instead of analog circuits. As pointed out by Nelson et al., conventional subtraction methods require that the two photodiodes are matched precisely beforehand. [2] Slow drift of laser pointing and non-flat spectral response curves of beam splitters or other optics can unbalance the photodiodes. That is why the ratiometric method is more commonly used in kHz lasers even when two matched photodiodes are used. The ratiometric method is almost exclusively used (as far as we know) for multi-pixel detector arrays such as CCD because two detector arrays cannot be easily pre-balanced across the whole spectral range by analog circuits. Pre-balancing is especially difficult for detectors with widely varying pixel responsivities, like our MCT array.

In our subtraction method, pre-matched detectors are not required. Instead we calculate the coefficient b from experimentally measured intensities using eq. (14), which can also be refreshed during measurement to compensate any possible drift (discussed in detail later). Note that for an array detector with N pixels referenced by a single pixel detector or by another array detector with N pixels, a total of N coefficients will need to be calculated to reflect the variation in both the responsivity and spectral intensity on the individual pixels.

B. Combination of Multi-Reference-Channel

As shown in Eq. (15), the performance of our referencing method only depends on the correlation coefficient R. When using an array as reference, the reference pixel does not need to detect the same wavelength as the signal pixel nor need to be a physical pixel. Below we will show that it is possible to linearly combine all physical reference pixels into an optimal virtual reference pixel which maximizes R.

Figure 6:
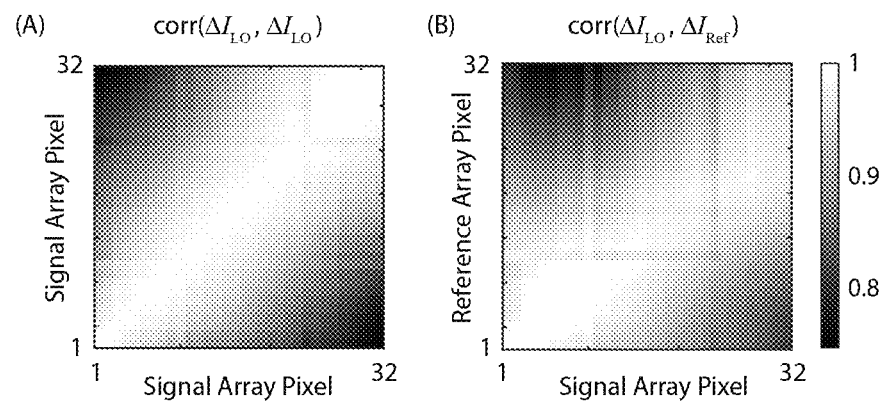
FIG. 6 are plots of spectral correlation according to embodiments of the present invention.

FIG. 6(A) shows the spectral correlation map for $\Delta I_{LO}$ in the signal array, corr($\Delta I_{LO}$, $\Delta I_{LO}$). It is clear that $\Delta I_{LO}$ on different pixels is most correlated when their wavelengths are close, and the correlation decreases with increasing wavelength difference. This feature of spectral correlation is quite typical for femtosecond lasers [6], but it may also be more complex depending on the nature of the light source [7].

In FIG. 6(B), the spectral correlation map between the signal array and the reference array, corr($\Delta I_{LO}$, $\Delta I_{Ref}$), also shows similar features. This means that multiple pixels in the reference array contain information about the intensity fluctuations of a single pixel in the signal array. It is therefore possible to find a linear combination of these reference pixels that will give a higher correlation with the signal pixel than any single reference pixel. Following Eq. (13), we write:

$$\Delta K(i) = \Delta I_{LO}(i) - \Delta I_{Ref} \beta_i \quad (16)$$

Assuming that the signal array has m pixels and reference array has n pixels, $\Delta K$ and $\Delta I_{LO}$ are random row vectors with m components, and $\Delta I_{Ref}$ is a random row vector with n components. $\Delta K(i)$ and $\Delta I_{LO}(i)$ are $\Delta K$ and $\Delta I_{LO}$ for the $i^{th}$ signal pixel, respectively, and $\Delta I_{Ref}(j)$ is $\Delta I_{Ref}$ for the $j^{th}$ reference pixel. $\beta_i$ is a column vector with n components, and its $j^{th}$ component represents the contribution of $\Delta I_{Ref}(j)$ to the $i^{th}$ virtual reference pixel. Since the expected value of $\Delta K(i)$ is zero for any $\beta_i$, the variance of the $\Delta K(i)$ can be minimized by ordinary least squares. A closed-form expression for $\beta_i$ exists:

$$\beta_i \stackrel{def}{=} \langle \Delta I_{Ref}^T \Delta I_{Ref} \rangle^{-1} \stackrel{def}{=} \langle \Delta I_{Ref}^T \Delta I_{LO}(i) \rangle \quad (17)$$

where the brackets indicate evaluating the expected values of random variables. Note that in practice, the random vectors are treated as data matrices in order to evaluate their statistical properties. For the single-reference-channel case, $\beta_i$ reduces back to b in Eq. (14). Combining all m signal pixels, Eq. (17) can be written as a concise matrix expression:

$$B \stackrel{def}{=} \langle \Delta I_{Ref}^T \Delta I_{Ref} \rangle^{-1} \stackrel{def}{=} \langle \Delta I_{Ref}^T \Delta I_{LO} \rangle = \text{cov}(\Delta I_{Ref})^{-1} \text{cov}(\Delta I_{Ref}, \Delta I_{LO}) \quad (18)$$

where $B=(\beta_1, \beta_2, \ldots, \beta_i, \ldots, \beta_m)$ is a n×m matrix. The $2^{nd}$ equality in Eq. (18) utilizes the fact that the expected values of $\Delta I_{Ref}$ and $\Delta I_{LO}$ are zero vectors. The matrix cov ($\Delta I_{Ref}$) is positive-definite because the detector noises are always linearly independent between different pixels. Therefore, matrix inversion can be robustly and efficiently computed by the Cholesky decomposition, even when the reference array has many pixels. Inserting Eq. (17) back into Eq. (16), we get the residual noise after multi-channel referencing:

$$\frac{\text{var}_{min}(\Delta K(i))}{\text{var}(\Delta I_{LO}(i))} = \frac{1}{1 - \frac{\text{cov}(\Delta I_{LO}(i), \Delta I_{Ref})\text{cov}(\Delta I_{Ref})^{-1}\text{cov}(\Delta I_{Ref}, \Delta I_{LO}(i))}{\text{var}(\Delta I_{LO}(i))}} \quad (19)$$

The quotient on the right-hand side of Eq. (19) is a generalization of $R^2$ in Eq. (15). It is also non-negative, which guarantees that multi-channel referencing will not increase the noise level.

The third row of FIG. 5 illustrates the statistics of residual additive noise after multi-channel referencing with a virtual pixel that linearly combines all 32 physical reference pixels. The autocorrelation is almost flat around zero after the initial drop, which resembles that of ideal white noise. Compared with $\Delta I_{LO}$, the histogram of $\Delta K$ has a much narrower distribution, and the amplitude spectrum is lowered by about 10 dB.

Compared with the single-channel method, noise suppression is more effective with the multi-channel method.

Figure 7:
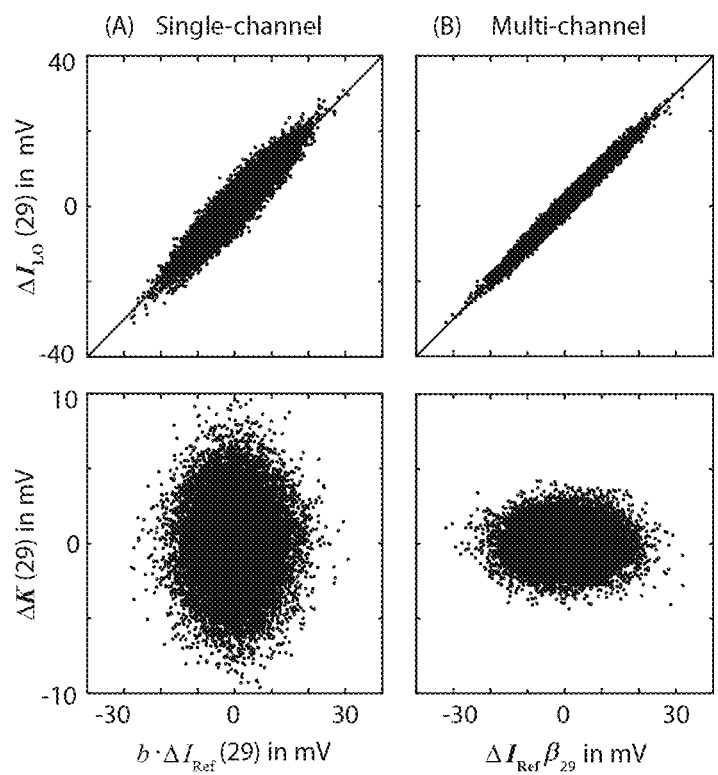
FIG. 7 are plots of performance improvement of multi-channel over single-channel referencing according to embodiments of the present invention.

FIG. 7 is a scatter plot of a trajectory with 10K data points to show the relationship between the 29th signal pixel and the 29th physical or virtual reference pixels. The left column (A) is for the single-channel method in Eq. (13). The right column (B) is for the multi-channel method in Eq. (16). The coefficient b and column vector $\beta_{29}$ were optimized based on Eq. (14) and (17), respectively. The black line in the top row is y=x is the best linear least-squares fit of the data.

FIG. 7 shows that the virtual reference pixel provides a better prediction of $\Delta I_{LO}$ with much less scattered residual noise $\Delta K$ than the physical reference pixel. The correlation coefficient R is 0.935 in the single-channel method and is optimized to 0.988 in the multi-channel method, resulting in an additional noise reduction of 2.3 times. The noise suppression follows the predicted $(1-R^2)^{1/2}$ dependence from Eq. (15) and (19), where $\sigma(\Delta K)$ drops steeply when R approaches 1. For pixels that measure the spectrum edge with low light intensity, the uncorrelated detector noises will lower R so that single-channel referencing is not as effective. Multi-channel referencing, however, can maximize R by utilizing the spectral correlation between different wavelengths.

Figure 8:
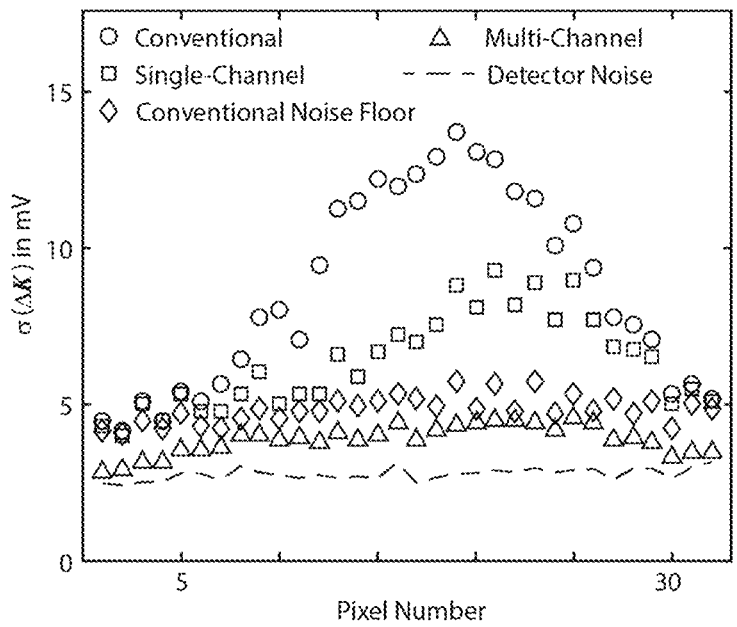
FIG. 8 are plots of $\Delta K$ noise for different reference methods according to embodiments of the present invention.
Figure 17:
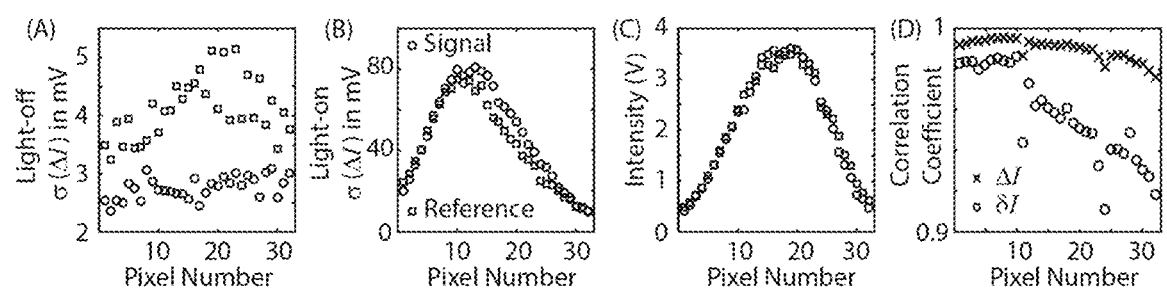
FIG. 17 are plots that characterize the mid-IR data set according to embodiments of the present invention.

FIG. 8 is a plot of performance of different reference methods as measured by $\sigma(\Delta K)$. The circles, squares, and triangles show the results from the conventional ratiometric, our single-channel, and our multi-channel reference method, respectively. The diamonds show the total noise floor in the conventional methods, and the black dashed line shows the detector noise of the signal array only. Raw data statistics are shown in FIG. 17, where FIG. 17(A) shows $\sigma(\Delta I)$ with the light off, FIG. 17(B) shows $\sigma(\Delta I)$ with the light on, and FIG. 17(C) shows the mean spectrum for the two rows of the 2×32 MCT array. Circles are for the signal array and squares are for the reference array.

FIG. 8 illustrates how close each method can push the residual noise $\sigma(\Delta K)$ toward the noise floor. For the $13^{th}$ signal pixel, which is the noisiest in this dataset, the conventional ratiometric, our single- and multi-channel referencing methods suppress the noise by a factor of 7.2, 12.2 and 19.6, respectively. In the conventional methods, the total noise floor contains detector noises from both signal and reference pixels, and can be approximated by the root-sum-square of both contributions. The residual noise after conventional referencing is still well above the conventional noise floor, indicating that the theoretical limit cannot be achieved in practice. In contrast, our multi-channel method brings the residual noise below the conventional noise floor, and only ~38% higher than the detector noise of signal array. This means that there is a different noise floor limit for the new method (discussed below in Sections 5A and B). Using multi-channel referencing, the best achievable $\sigma(\Delta K/I_{LO})$ before averaging is lower than 1/1400 with MCT detectors working in the linear range, or 1/2000 in the nonlinear range (see Section 5C). This corresponds to a RMS noise level below 10 µOD (OD is the absorbance in 10-base) after averaging over 500 pairs of laser shots (1 second).

The algorithm described above is a simple form of linear regression. The concept of linear combination and subtraction, instead of ratiometry, is very useful because many linear regression algorithms have been developed for different situations. The eq. (17) used OLS which assumes homoscedasticity. The symmetric distribution of residual noise in FIG. 7 somewhat validates this assumption. Other types of linear regression may be used depending on the nature of light sources and properties of detectors. This includes but is not limited to: robust regression to remove the outlier shots, weighted least squares for heteroscedasticity, and generalized least squares when correlation exists between the residual noises. We did not find these methods necessary under our experimental conditions. Besides, a linear algebra-based algorithm is very efficient and easily applicable for high rep rate systems, using either CPU/GPU to process the data, or even FPGA/DSP to process data in real-time.

C. Implementation Methods

In the above discussion, we collected all the LO spectra without the nonlinear signal (pump blocked) and calculated B. In real data collection, the LO is mixed with the nonlinear signal and hence B needs to be estimated. One natural idea is to insert a small amount of blank shots without signal (pump is blocked but other conditions are the same) and estimate B based on these shots. Accordingly, shots that contain signal are called signal shots. There are many ways to distribute blank shots. In this section we keep at least two consecutive blank shots inserted between signal shots to satisfy the definition of $\Delta I$. See the extended definition and method for $\Delta I$ in section 5D. We will consider two special cases while keeping the total number (percentage) of blank shots the same. In the fully-aggregated case, all the blank shots are collected together in one segment of data acquisition period. In the fully-dispersed case, only one blank-shot pair is inserted at a time, and the blank-shot pairs are distributed evenly among the signal shots. B is estimated after all the blank shots are collected. To characterize the quality of the estimation for B, we define a quality factor q:

$$q = \left\langle \frac{\sigma(\Delta K) \text{ based on the estimated } B \text{ from blank shots}}{\sigma(\Delta K) \text{ based on the optimal } B \text{ from all shots}} \right\rangle \quad (20)$$

The brackets indicate the quadratic mean of all pixels. By definition, q is always larger than 1. The closer q is to 1, the better the estimation.

To evaluate the number of blank shots needed and the convergence of B estimation toward the optimal B, we saved 100 datasets each of 40K total shots. For each dataset, we assigned a certain number of blank shots and calculated the corresponding estimated B and q.

Figure 9:
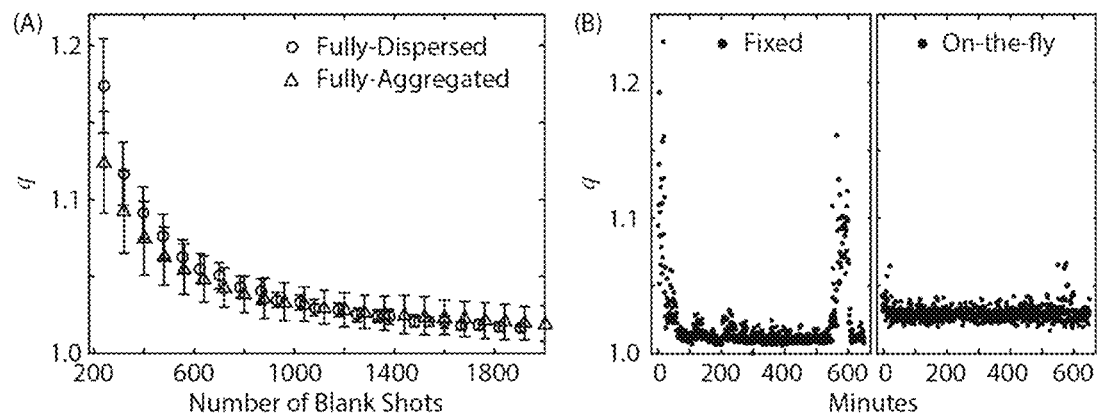
FIG. 9 are plots of quality factor q for B estimation according to embodiments of the present invention.

FIG. 9(A) plots the mean value and standard deviation of q over the 100 datasets versus the number of blank shots, with the blank shots distributions being either fully-aggregated or fully-dispersed. Circles are for the fully-dispersed case and triangles are for the fully-aggregated case. For both distributions, q decreases rapidly at the beginning, reaching around 1.03 with only 1000 blank shots or 2.5% of the total shots. Further convergence is much slower, and may be unnecessary considering the extra time cost of collecting more blank shots. Note that these numbers are validated with our MCT array which has only 32 pixels for reference detection. For a reference detector that has many more pixels, such as a CCD/CMOS array, the number of blank shots should be much higher than the number of pixels so that B estimation is an overdetermined problem. FIG. 9(A) also shows that the fully-aggregated case gives a lower q than the fully-dispersed case when the number of blank shots is low. This trend is reversed with more blank shots. The former behavior is because the fully-aggregated case generates (n−1) consecutive pairs from n blank shots, whereas the fully-dispersed case only generates n/2 pairs. With more consecutive pairs, B estimation is more accurate, especially when the number of blank shots is low. However, the fully-aggregated blank shots are not as representative of the statistical feature of the whole dataset as the fully-dispersed blank shots. This explains why the fully-dispersed case gives a lower q for larger numbers of blank shots. Furthermore, the fully-dispersed case also gives much smaller standard deviations, and hence the performance is more robust across different datasets. On the other hand, the fully-aggregated distribution has the advantage of early convergence and can be easily implemented in any experimental setups by simply blocking the pump (or signal) beams manually or with a motorized optical shutter. The fully-dispersed distribution generally requires a fast modulator like an AOM to arbitrarily control the percentage of blank shots, although it can also be achieved by a modified mechanical chopper wheel. Depending on the specific experimental details, such as the number of reference pixels and the laser repetition rate, it is possible to design another distribution of blank shots that combines the benefits of both cases.

To check the long-term stability of B estimation, we saved a dataset of 8000 shots (which takes 8 seconds) every minute over a period of about 11 hours. Immediately before the data collection began and after about 9 hours into the process, we refilled the MCT array with $LN_2$ to introduce an external disturbance. We calculated the q factor by estimating B in two ways: first, by using the whole 8000 shots taken at 300 min and applying this fixed B to each dataset; and second, by using the first 800 shots in each dataset and applying the "on-the-fly" B to the entire 8000 shots of that dataset.

FIG. 9(B) shows the q factor as a function of time. The left panel shows performance vs. time using a fixed B estimated from a single dataset, whereas the right panel shows performance vs. time using B refreshed on-the-fly. The fixed B estimation works quite well during the period without external disturbance. The q is about 1.01, lower than that of "on-the-fly" estimation because more blanks shots are included in the estimation. The fixed B performance is less satisfactory when the MCT array was refilled with $LN_2$. In comparison, the "on-the-fly" method has a steadier performance even when $LN_2$ was added. Depending on the types of detectors and stability of lasers, both the fixed and "on-the-fly" estimation methods can find their applications. Essentially, our method digitally post-balances arbitrary detectors with a small additional cost of time. Unlike those analog-balanced photodiodes with fixed balancing settings, our method can compensate for slow drifts of system during data collection when B is refreshed periodically.

Another question is whether B must be refreshed when scanning some experimental parameters. These experimental parameters include, but are not limited to, the T delay (transient absorption), the τ delay (photo echo), the wavelength (hole-burning), the polarization state of excitation beams, and the sample position (OCT). In Eq. (18), B depends on the LO and reference beams but not on the sample signal. Therefore, B has to be refreshed only when the intensity/spectrum of the LO or reference beams are changed in a parameter scan. Most parameter scans, including the ones stated above, do not change the LO or reference beams, and therefore a new B is not required. One exception is when the position of a heterogeneous sample is scanned in a pump-probe experiment. In experiments like the heterodyne photo echo or OCT, where the LO (in OCT the LO goes through the reference arm) and reference beams do not pass through the sample, a new B is not required even when the sample position is scanned.

After B is estimated from the blank shots using Eq. (18), the additive noise in the signal shots is then removed by calculating Eq. (21). The involved matrix operations can be efficiently calculated in real time even for high-repetition-rate systems [16, 20, 24].

$$S \stackrel{\text{def}}{=} \Delta I_{tot} - \Delta I_{Ref} B \quad (21)$$

Figure 10:
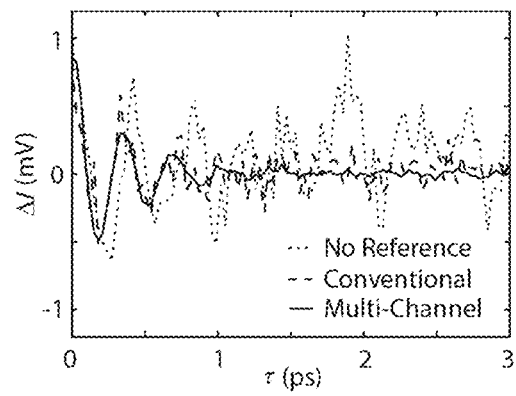
FIG. 10 is a plot of a signal before and after suppressing additive noise with different methods according to embodiments of the present invention.

To illustrate the effect of proper referencing, FIG. 10 shows a sample scan over the coherence time τ in a 2D IR experiment of a solution of N-methylacetamide (NMA-d) in deuterated water with a 5 mOD amide-I peak in the FTIR spectrum. Performance of multi-channel referencing (solid line) is compared with conventional ratiometric referencing (dashed line) and no referencing (dotted line). Convolutional noise is not removed yet. The traces come from the same dataset processed with three different referencing methods, and they are shown without applying any smoothing. A fully-aggregated blank shot distribution was adopted for the multi-channel referencing. Compared with the traces without referencing and with the conventional ratiometric referencing, our multi-channel referencing significantly improves the SNR. We typically observe a 10-30 times improvement over no referencing in our system.

Sometimes linear combinations (such as subtraction, average, and FFT) of data from different signal pixels or from multiple signal detectors (like balanced heterodyne detection) are needed. Our reference scheme is fully compatible with these operations. It can be easily shown that Eq. (18) and (21) are still the optimal solutions to additive noise suppression for combined pixels, as long as the equations are applied before linear combinations.

3. Suppression of Convolutional Noises

The next step is to suppress the convolutional noise. Combing Eq. (2), (16) and (21), the heterodyned signal for the $i^{th}$ signal pixel in pump-probe experiments with chopping becomes:

$$S(i) = \Delta K(i) + \chi^{(3)} I^*_{LO} I^*_{Pu}(i) \quad (22)$$

As shown in Eq. (4), we can remove the intensity fluctuations in $I^*_{LO} I^*_{Pu}$ by dividing by $[1+(\delta I/\bar{I})]$ for both beams. For phase-cycling in Eq. (3), the expression is more complex because it contains $(I^*_{LO} I^*_{Pu} + I'_{LO} I'_{Pu})$ involving both consecutive shots. For other techniques in general, we can remove the fluctuation by dividing the expression by $[1+(\delta I/\bar{I})]^{1/2}$ for LO and each occurrence of field-matter interaction of the excitation beams. For the excitation beams derived from the same source as the LO, their intensity fluctuation is tracked by the reference detector. Otherwise, the intensity fluctuation of each excitation beam can be monitored individually by a photodetector. In principle, the convolutional noises need to be factored out from the correct version of Eq. (22) for different techniques in a shot-to-shot basis. Otherwise, the spectrum will be distorted even with infinite averaging due to non-zero correlation between the intensities of different beams (e.g. the third term in the parenthesis of Eq. (5)), as discussed previously [5]. In reality, we found that signal distortion is usually negligible compared with other noise terms within reasonable averaging time. We also took the solid line trace in FIG. 10 and further removed the convolutional noise and did not notice observable differences. This is consistent with our earlier analysis in Section 1A that the convolutional noise is orders of magnitude smaller than the additive noise in pump-probe spectroscopy.

Although our reference detector is an array, we usually sum over all its pixels and use the result to factor out LO intensity fluctuation. We found that this simple method is sufficient for our purpose. It also avoids the numeric instability problem if some pixels give near zero intensity. However, sometimes the LO intensity on every signal pixel is needed if the intensity fluctuations at different wavelengths are very different. This information can be reconstructed by the same B in Eq. (18) utilizing reference detectors which can have different numbers of pixels. For experiments using chopping, the LO spectrum of the pumped shot can be reconstructed from the un-pumped shot as:

$$\hat{I}^*_{LO} \stackrel{\text{def}}{=} I'_{LO} + \Delta I_{Ref} B \quad (23)$$

Here the hat ^ symbol denotes the reconstructed intensity. From Eq. (16), the reconstruction error is $I^*_{LO} - \hat{I}^*_{LO} = \Delta K$. For experiments using phase-cycling, $(I^*_{LO} + I'_{LO})$ can often be approximated by $(I^*_{tot} + I'_{tot})$ because the $E_{LO} E_{Sig}$ terms with opposite phase cancel each other, except for when strong background signals remain. With this approximation, the LO spectrum can be reconstructed as:

$$\hat{I}^*_{LO} \stackrel{\text{def}}{=} (I^*_{tot} + I'_{tot} + \Delta I_{Ref} B)/2 \hat{I}'_{LO} \stackrel{\text{def}}{=} (I^*_{tot} + I'_{tot} - \Delta I_{Ref} B)/2 \quad (24)$$

with reconstruction errors being $I^*_{LO} - \hat{I}^*_{LO} = \Delta K/2$ and $I'_{LO} - \hat{I}'_{LO} = -\Delta K/2$. As already shown in FIG. 8, ΔK is very small, which means that Eq. (23) and (24) can reconstruct LO spectra with high accuracy.

Figure 11:
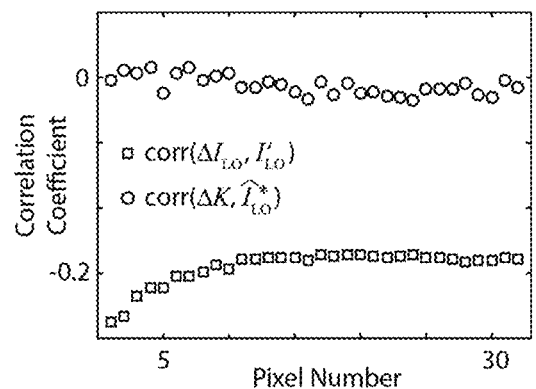
FIG. 11 is a plot of the effect of referencing on correlation coefficients according to embodiments of the present invention.

When dividing Eq. (22) by the $[1+(\delta I/\bar{I})]^{1/2}$ terms to suppress convolutional noise, the residual additive noise ΔK is also divided by these factors. While ΔK is zero-mean, the quotient is not necessarily zero-mean. In fact, the baseline of a pump-probe spectrum without referencing, $\stackrel{\text{def}}{=} \Delta I_{LO}/I'_{LO}\rangle$, is not zero [5] although $\stackrel{\text{def}}{=} \Delta I_{LO}\rangle$ is zero, which is due to their nonzero corr(ΔI, I')=$-[(1-r)/2]^{1/2}$. Furthermore, this correlation can have wavelength-dependence as shown in FIG. 11. In FIG. 11, the correlation coefficient is between $\Delta I_{LO}$ and $I'_{LO}$ (squares) and between ΔK and $\hat{I}^*_{LO}$ (circles). This leads to a wavelength-dependent baseline shift, especially when a supercontinuum probe is used [7]. In comparison, corr(ΔK, $\hat{I}^*_{LO}$) with $\hat{I}^*_{LO}$ reconstructed from Eq. (23), is basically zero as shown in FIG. 11. This guarantees that the baseline of pump-probe spectra with our reference scheme, $\stackrel{\text{def}}{=} \Delta K/\hat{I}^*_{LO}\rangle$, converges to zero. When the referencing performance described by Eq. (19) is very good, ΔK is virtually uncorrelated with the intensity fluctuation of any beam because it mainly contains uncorrelated detector noise and photon shot noise. In summary, our reference scheme does not introduce baseline shift and signal distortion in the step of convolutional noise suppression.

4. Suppression of δI Noises with Coefficient A

Although δI and ΔI have different statistics, our referencing method can be easily extended to reduce the δI noise. FIG. 6(B) shows the spectral correlation between $\Delta I_{Ref}$ and $\Delta I_{LO}$. Similar correlations also exist between $\delta I_{Ref}$ and $\delta I_{LO}$, so it is possible to find a linear approximation of $\delta I_{LO}$ from the $\delta I_{Ref}$. Consistent with eq. (12) and (13), we define:

$$\delta K \stackrel{def}{=} \delta I_{LO} - \delta I_{Ref} A \quad (25)$$

where $\delta I_{LO}$ and $\delta I_{Ref}$ are random row vectors that contain all the pixels of respective arrays, and A is a matrix with the same dimension as B. By definition, $\langle \delta I_{LO} \rangle = \langle \delta I_{Ref} \rangle = 0$, hence the mean value of $\delta K = 0$. Now $\delta K$ is minimized instead of $\Delta K$, which yields similar results as eq. (18) and (19):

$$A = \text{cov}(I_{Ref})^{-1}\text{cov}(I_{Ref}, I_{LO}) \quad (26)$$

$$\frac{\text{var}_{min}(\delta K(i))}{\text{var}(I_{LO}(i))} = 1 - \frac{\text{cov}(I_{LO}(i), I_{Ref})\text{cov}(I_{Ref})^{-1}\text{cov}(I_{Ref}, I_{LO}(i))}{\text{var}(I_{LO}(i))} \quad (27)$$

Figure 12:
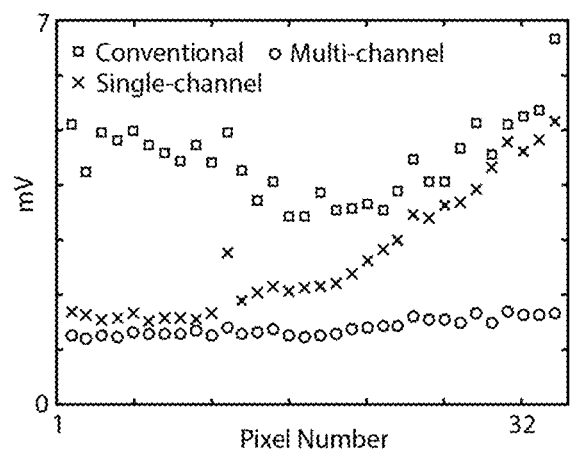
FIG. 12 is a plot of $\delta K$ noise of different methods according to an embodiment of the present invention.

These equations can also be simplified into single-reference-channel, which yields similar equations as eq. (13)-(15). In FIG. 12, we plot the rms value of $\delta K$ with different referencing methods. The standard deviation of residual noise $\delta K$ is in mV after referencing with the conventional ratiometric method (squares), single-channel method (X), and multi-channel method (circles). Clearly the single-channel method already improves over the conventional ratiometric method, and the multi-channel method further gives a uniform noise suppression across the whole spectrum. Similar to B, we can use a small percentage of blank shots to estimate A.

For techniques using chopping or phase-cycling, the signal is defined by the intensity difference between two shots, and $\Delta I_{LO}$ constitutes the additive noise. In that case, B in eq. (18) and (21) is the natural choice. However, there is also a class of techniques which do not use chopping or phase-cycling (most notably OCT), wherein $\delta I_{LO}$ constitutes the additive noise. For these techniques, the additive noise can be suppressed by:

$$I_{tot} - \bar{I}_{LO} - (I_{Ref} - \bar{I}_{Ref})A \quad (28)$$

A can also be used in convolutional noise reduction with eq. (29) and the division method discussed in Section 3, even when B is already chosen to suppress the additive noise.

$$\bar{I}_{LO} \stackrel{def}{=} \bar{I}_{LO} + (I_{Ref} - \bar{I}_{Ref})A \quad (29)$$

In spectral-domain OCT (SD-OCT), the sample position is continuously scanned (B-scan) while a spectrum is taken (A-scan) by an array detector at each sample position.

Figure 13:
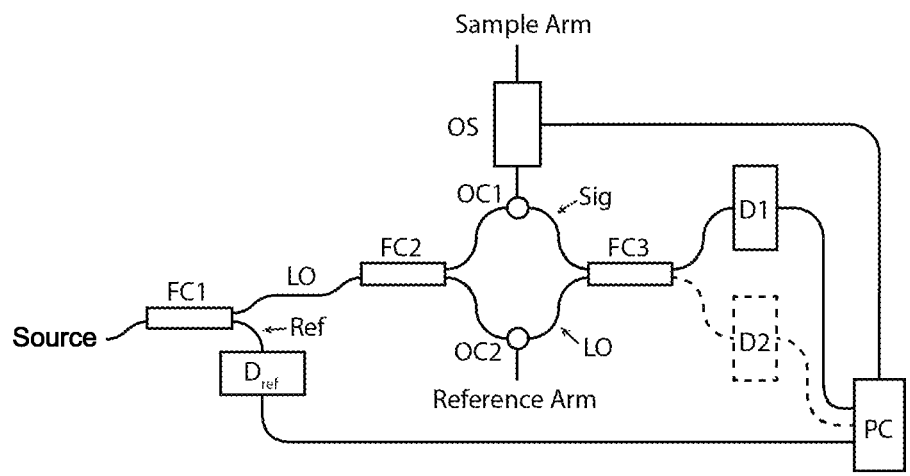
FIG. 13 is a schematic diagram of a modified OCT system for reference detection according to an embodiment of the present invention.

FIG. 13 is a schematic of a modified OCT configuration setup for reference detection. A broadband input light source is first split by a fiber coupler FC1. A portion of the light is sent to a reference detection system, $D_{ref}$. The remainder of the light is sent to FC2, which splits the light to two optical circulators: OC1 and OC2. OC1 sends light to the sample arm (to generate the sample signal), and OC2 sends light to the reference arm (to generate the LO). The returning light from both arms is combined in FC3, and detected by two detection systems, D1 or/and D2. When both D1 and D2 are used, it is called balanced-heterodyne detection. The resulting digital signals are sent to a computer. A fast optical switch, OS, acts as a beam blocker to block the light into the sample arm to collect the blank shots for referencing. The OS can be synchronized to the detection system and a galvanometric scanner.

Note that, as shown in FIG. 13, the reference arm in OCT corresponds to the LO beam in this invention, while the reference beam herein is an additional copy of LO beam which does not mix with the back-scattered signal from the sample arm. The reference detection can be implemented by adding a line-scan array spectrometer to the conventional SD-OCT system, or using a multi-line array spectrometer. For a low-cost option, a photodiode can also be used as the reference detector. As mentioned earlier, the reference detection can be used together with balanced heterodyne detection to reduce the auto-correlation artifacts as well as LO fluctuation in OCT. For OCT, since there is no pump beam, the signal after referencing can be written as:

$$\frac{I_{tot}}{\bar{I}_{LO} + (I_{Ref} - \bar{I}_{Ref})A} - 1 \quad (30)$$

which suppress both the additive and convolutional noises in one step.

We also need $\bar{I}_{LO}$ to reconstruct the LO intensity, which can be estimated from the mean intensity of blank shots. This can be accomplished by a fast optical switch which can block the light into the sample arm (FIG. 13). The optical switch should be synchronized to the detector array and galvanometric scanner. There is some dead time in the OCT B-scan [26] during which the blank shots can be collected without sacrificing the signal collection efficiency.

Due to the slow drift of light source, the $\bar{I}_{LO}$ is slowly changing. This drift makes the performance of A referencing not as robust as B referencing. This is demonstrated by the $4^{th}$ row in FIG. 5, where the $\delta K$ still has a 1/f noise feature, indicating low frequency noise (drift) is not fully removed. Whenever possible, the B referencing (including the extended method discussed in Section 5D) is preferable over A referencing discussed in this section.

5. More Demonstration and Discussion

In previous sections, we analyzed different noises in optical heterodyne spectroscopy, and discussed the methods to suppress them. In this section, we will discuss their applications in different scenarios. Because the present invention focuses on reference detection, we classify the scenarios by their detection-relevant rather than sample-relevant aspects. Some of the applications have already been demonstrated by us, and some are natural extension that can be demonstrated.

A. Referencing with Different Numbers of Pixels

Figure 14:
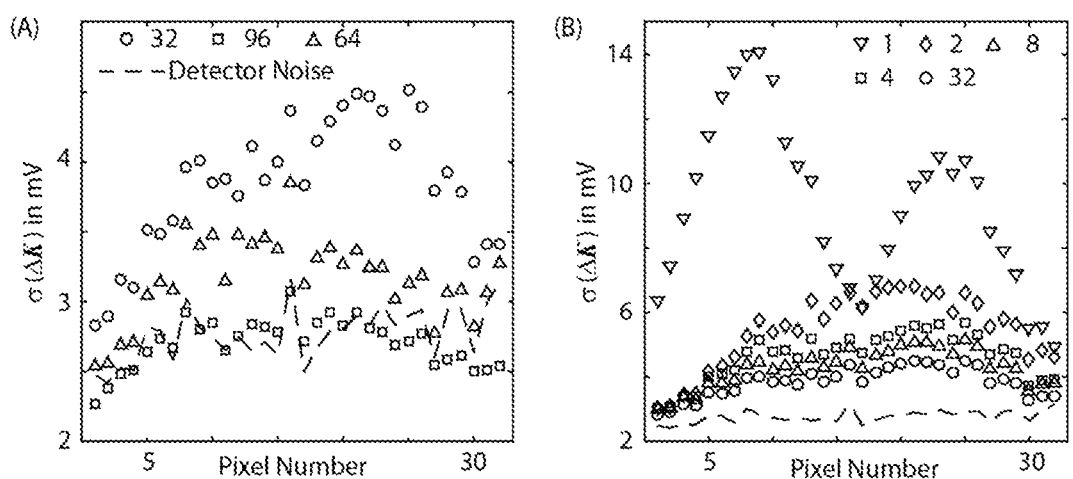
FIG. 14 are plots of $\Delta K$ noise using different numbers of reference pixels according to embodiments of the present invention.

With the concept of virtual reference pixels, the signal and reference detection no longer need to be matched because there is no requirement for pixel wavelength mapping. To test this, we used a 1×64 pixel MCT array as an additional reference detector. It has different pixel size, responsivity and electronics from those of the 2×32 array, and was placed behind a home-built spectrograph (see FIG. 4). FIG. 14(A) shows σ(ΔK) of the signal array after referencing with different arrays. The residual noise is after referencing with a 32-pixel array (circles), an unmatched 64-pixel array (triangles), and a combined 96-pixel array composed of the 32- and 64-pixel array (squares). The detector noise of the signal array is shown as the dashed line in both panels. Because the detector noises of our signal and reference arrays were partially correlated, some pixels on the square curve show residual noise slightly below the detector noise.

While referencing with the 32 pixels on the bottom reference array is already effective, referencing with the 1×64 pixel array performs even better. This is clear evidence that matched detectors are not necessary in our scheme. Moreover, referencing with a combination of 96 pixels from both arrays further improves the performance compared to referencing with individual arrays. This is because the combination of multiple arrays increases the degrees of freedom and enables better minimization in Eq. (17). Therefore, a major advantage of our method over the conventional methods is that including more reference pixels helps to further reduce noise instead of introducing additional noise.

The residual noise after 96-pixel referencing is on the same level as the detector noise of the signal array. This shows that, with complete referencing, the lowest possible residual noise level is the noise floor of the signal array only, which has not been realized before (to the best of our knowledge). This theoretical limit is even lower than that of analog-balanced photodetectors, where the photon shot noise and dark noise of the reference photodiode will add to the total noise floor.

To explore the effect of reducing the number of reference pixels, we digitally binned the data from adjacent reference pixels. The results are shown in FIG. 14(B). The number of reference pixels is indicated in the legend. The number of reference pixels was reduced from 32 to 8, 4, 2, and 1 by digitally binning over 4, 8, 16, and 32 adjacent pixels, respectively, and re-calculating B for each case. The circle curve in (A) and (B) is the same as the triangle curve in FIG. 8. As expected, full 32-pixel referencing gives the best noise suppression, yet the performance of 4-pixel referencing is already reasonably good. The small improvement over a large increase in the number of pixels suggests that most of the pixels in the reference array are providing largely redundant information. We believe that this redundancy is common in various detection systems, although the amount of redundancy depends on the total number of reference pixels and characteristics of light source. A reference array with less pixels is preferable when the per-pixel cost of the detector is high, especially in the near-IR and mid-IR range. Less reference pixels may also be preferable when the LO is not intense so that only a small portion of the energy can be used for reference detection without sacrificing the SNR on the signal detector [16]. For this case, one way to achieve good referencing is to use the same type of detectors for signal and reference detection, but to reduce the number of reference pixels by using a much less dispersive spectrograph to give a similar light intensity on the signal and reference pixels.

B. Effect of Detector SNR and Noise Floor

In this section we explore the effect of detector SNR on reference performance. Because our MCT arrays have relatively high SNRs, we can simulate detectors with lower SNRs by adding different amounts of noise to the raw data before referencing. This also provides a simulation for detectors in other spectral range, like CCD and CMOS arrays which typically have lower SNRs. Two different patterns of noises were added to simulate two types of detectors where either detector noise $(N_r^2 + D \cdot t)^{1/2}$ or photon shot noise $(N_{LO})^{1/2}$ dominates the noise floor. Both noises are white Gaussian noises with zero means, but they have different pixel dependencies because photon shots noise depends on the intensity.

Figure 15:
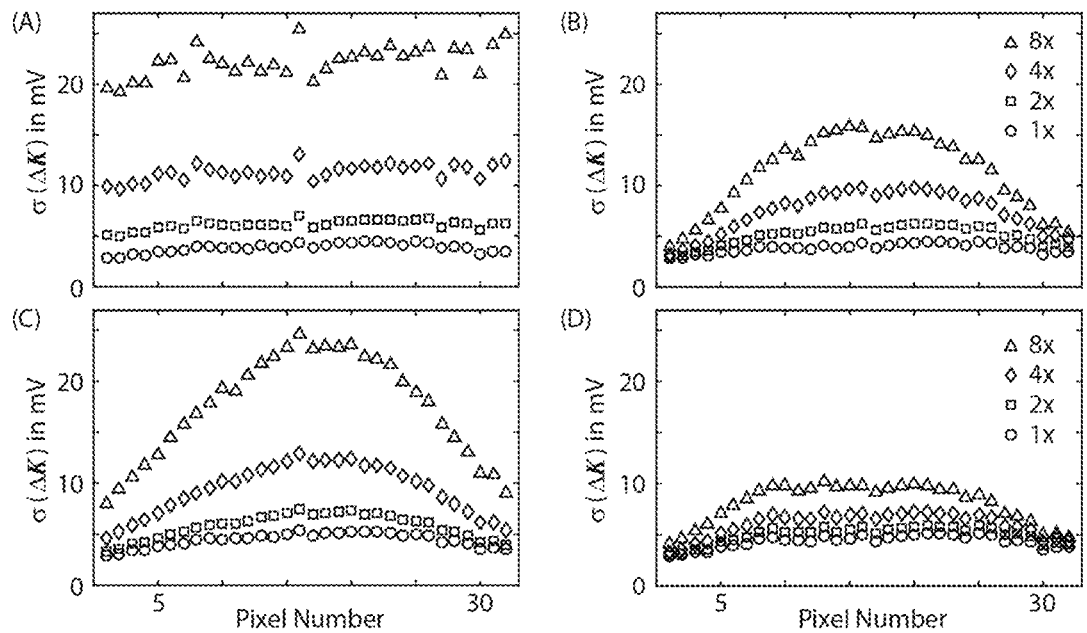
FIG. 15 are plots of $\Delta K$ noise using a different fundamental noise floors according to embodiments of the present invention.

FIG. 15(A) shows the residual noise after increasing the detector noise in the signal array to l multiples of the original level, and FIG. 15(B) shows results for increasing the detector noise in the reference array. The legend indicates the multiples (l) of noise included. Because the original data already contains one part of detector noise, the added detector noise is scaled by $(l^2-1)^{1/2}$. The statistics of the raw data measured with light off and on, respectively, are plotted in FIG. 17(A) and FIG. 17(B), where circles are for the signal array and squares are for the reference array. When the original dataset was taken, the highest detector SNR was ~2100 (1400) for the signal (reference) array. Increasing the detector noise level by 8 times reduces the highest SNR to ~260 (170), which are typical values for many CCD and CMOS arrays. FIG. 15(C) and FIG. 15(D) show the residual noise after adding l multiples of photon shot noise to the signal and reference arrays, respectively. Because photon shot noise on our MCT detector is negligible (Section 1C), we simulated its effect by generating uncorrelated white noise and scaling it proportionally to the square root of the mean intensity in FIG. 17(C). To compare directly with FIG. 15(A) and FIG. 15(B), the amount of photon shot noise is defined as "8 multiples" when adding it reduces the highest SNR of the signal (reference) array to ~260 (170). Other multiples are scaled accordingly.

When the noises are added to the signal array as shown in FIG. 15(A) and FIG. 15(C), the residual noise level increases almost linearly with the multiples. The pixel dependence of residual noises also reflects the type of noises added: almost flat for detector noise, and proportional to the square root of the mean intensity for photon shot noise. This means that the added noise directly enters into the residual noise, which is expected because referencing cannot remove the uncorrelated noises. On the contrary, the noise added to the reference array does not directly enter into the residual noise as shown in FIG. 15(B) and FIG. 15(D). The pixel dependence of $\sigma(\Delta K)$ is not flat when detector noise is added. Instead it loosely follows the pixel dependence of $\sigma(\Delta I)$ shown in FIG. 17(B). This behavior can be understood from Eq. (15) and (19), where the effect of noise in the reference array is transmitted to $\Delta K$ through $R^2$. Increasing the noise floor of the reference array reduces $R^2$, and hence degrades the referencing performance. The pixel dependence in FIG. 15(B) and FIG. 15(D) comes from the unsuppressed laser noise rather than the added white noise. $\sigma(\Delta K)$ in FIG. 15(D) is lower than that in FIG. 15(B) because the added photon shot noise is lower than the added detector noise (of the same multiples) outside the central pixels.

In addition, $\sigma(\Delta K)$ in both FIG. 15(B) and FIG. 15(D) is much lower than its counterparts in FIG. 15(A) and FIG. 15(C), and the advantage is even larger when the multiples are higher. This means that reducing the SNR of the reference array does not deteriorate the referencing performance as severely as reducing the SNR of the signal array. This is because the performance of our reference scheme is related to the effective SNR of virtual reference pixels, which is higher than the SNR of physical reference pixels. The extent of gain in effective SNR from linear combination of multi-channels depends on factors like the reference pixel count and the spectral correlation pattern between different wavelengths. In terms of detector choices, this means that it is more important to use high SNR detectors for signal detection. For reference detection, good referencing can be achieved by using detectors with either high pixel SNR or large pixel number. In the example of 96-pixel referencing, it is realized by including more pixels. In the example of less-pixel referencing, binning over adjacent pixels increases the effective SNR of resulting pixels, which partially compensates for the effect of less pixels.

C. Non-Linearity of Detectors

The pixels in an array detector can have significant non-uniform responsivity. More generally, the detector response is not linear against light intensity, and the non-linearity also varies across pixels. Most applications utilize detectors only in the linear range for simplicity. However, sometimes it is preferable to exploit the nonlinear range for better SNR [27].

Figure 16:
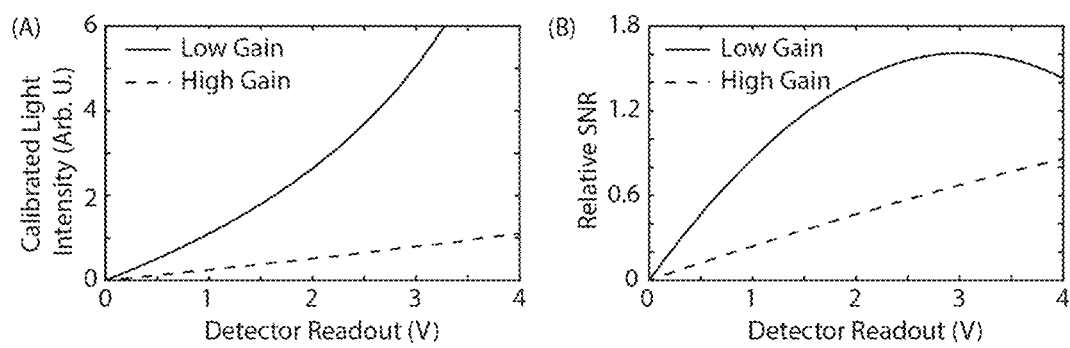
FIG. 16 are plots of the nonlinearity and SNR of an MCT detector for different gains according to embodiments of the present invention.

FIGS. 16(A)-(B) show characteristics of one pixel from our MCT arrays. The detector has adjustable gain settings corresponding to different full-well capacities. FIG. 16(A) are calibration curves for detector responsivity. FIG. 16(B) is relative SNR as a function of detector outputs. The dashed line (solid) is for high (low) gain where the response is linear (nonlinear).

Our MCT array has about twice the maximum SNR in the nonlinear range compared with the linear range, as shown in FIG. 16(B).

For our MCT array, the response is nonlinear when a low gain setting is used as shown in FIG. 16(A). We usually fit the calibration curve with a rational function $I=f(x)=P(x)/Q(x)$ where x is the detector readout, $P(x)$ is a quadratic or cubic polynomial, and $Q(x)$ is a linear polynomial. $f(x)$ is different for every pixel in the array, and it also depends on the spectral range and on the position where the light is focused on the pixel. This makes frequent re-calibration necessary, which is very time consuming. With conventional methods, $f(x)$ for both the signal and reference detectors must be accurately calibrated before the referencing step. With our referencing method, no $f(x)$ is needed for the additive noise suppression step. Equation (18) and Eq. (21) can be directly evaluated using the detector readout x, instead of the calibrated intensity I. The two equations can be applied to the nonlinear response because the calculation of A and B only involves terms representing small fluctuations around zero where the linear approximation is sufficient locally. We found that this method works well in the nonlinear response range with intensity fluctuation up to 10% (data not shown). In Section 5G we will show arbitrary level of nonlinearity and fluctuation can be properly accounted for by including some polynomial terms in the linear combinations.

To further remove the convolutional noise from the LO fluctuation, only $f(x)$ for the signal array is needed. The resulting S from Eq. (21) is calibrated by multiplying with the derivative $f'(x)$ which can be evaluated either at x of the pumped shot, or at mean x (the difference is negligible). When $f(x)$ is a rational function, $f'(x)$ is also a rational function which can be calculated analytically. The convolutional noise is then factored out from the calibrated S as described in Section 3 using the calibrated LO intensity. If the signal array is used in the linear range and the reference array is used in the nonlinear range, no calibration curves are needed and the higher SNR in the reference array can be exploited to achieve better referencing.

D. Extension of the ΔI Definition and B Estimation

In earlier sections, ΔI is defined as the intensity difference between two consecutive shots. This convenient definition is based on the fact that most chopping and phase cycling patterns are simply cycled by two shots. However, there exist complex scenarios that involve more than two shots. For example, in some dual-color pump-probe experiments, the signal is proportional to the difference between the $1^{st}$ and $3^{rd}$ shots. In some phase-cycling patterns, the signal is extracted by taking the difference between the $1^{st}$ shot and the mean of the $2^{nd}$ and $3^{rd}$ shots. Another scenario is when the detector pixel integrates several (n) light pulses before readout. This method is often used when the readout rate is slow compared to the laser repetition rate, or a single laser pulse is not intense enough to saturate the detector pixel. In this case, the signal is extracted by taking the difference in total energy between two consecutive groups of n laser pulses. In any of the above cases, the ΔI term should be defined according to the specific chopping, phase-cycling pattern, or detector readout mode.

For these complex scenarios, the corresponding B can be calculated from Eq. (18) while consistently defining ΔI for both Eq. (18) and Eq. (21). That is, ΔI in both Eq. (18) and Eq. (21) can be defined as the difference between a $1^{st}$ and $3^{rd}$ shot (this is a consistent definition), as opposed to ΔI in Eq. (18) being defined as the difference between consecutive shots and ΔI in Eq. (21) being defined as the difference between a $1^{st}$ and $3^{rd}$ shot (this is an inconsistent definition). We have validated this on our experimental setup and found it works well, although the residual noise marginally increased compared to the case of consecutive shots. However, such a consistent ΔI definition makes the implementation of blank shots more complex (especially for the fully-dispersed distribution) since it requires inserting different numbers of consecutive blank shots for different ΔI definitions. While this is not really an issue when a programmable optical modulator is available, it is almost impossible when a mechanical chopper is used.

Figure 18:
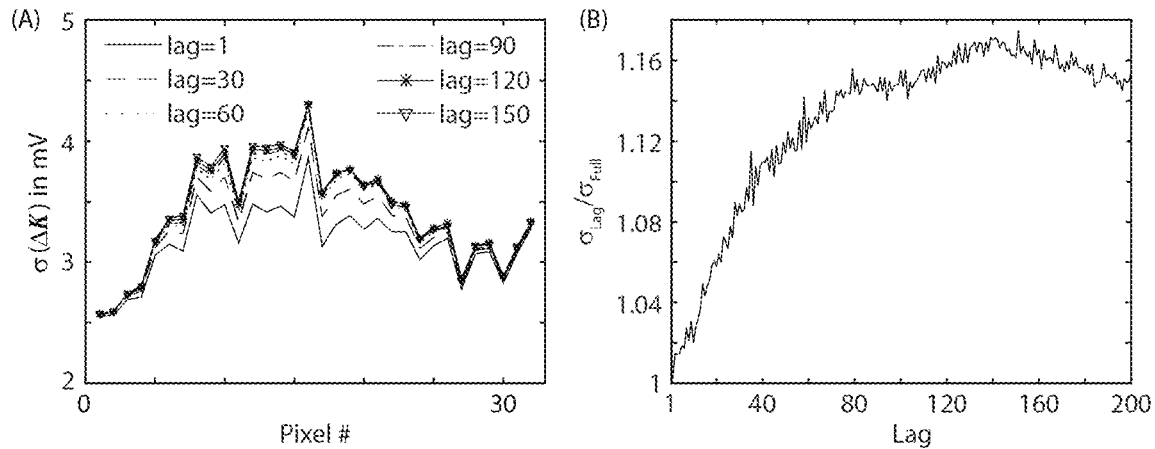
FIG. 18 are plots of $\Delta K$ noise using different lags according to embodiments of the present invention.

As a convenient alternative, we found that B can be estimated by inconsistently defining ΔI for both Eq. (18) and Eq. (21) with a negligible loss of performance. Consider a situation where we still want to reduce the ΔI between consecutive shots but estimate B based on ΔI of two shots with a given lag. FIG. 18 demonstrates the loss of performance as the lag increases. Lag=n is defined for the shot pair difference, Δ, between the current and $n^{th}$ consecutive shot. First B is calculated from shot pair difference with a given lag. Then this B estimate is used to calculate σ(ΔK) for the normal consecutive shot difference. Note that lag=1 corresponds to B calculation for the normal consecutive shot case (i.e. full referencing). In the chopping case, lag=2 corresponds to referencing with the chopped shots only. FIG. 18(A) shows σ(ΔK) of the mid-IR spectrum with B estimated with different lags. The 1×64 MCT array is used as the reference detector, and top array of the 2×32 MCT as the signal detector. FIG. 18(B) shows reference performance for pixel 15 in FIG. 18(A) as a function of lag. $σ_{Lag}$ is σ(ΔK) as defined in FIG. 18(A), and $σ_{Full}$ is σ(ΔK) with lag=1.

FIG. 18A shows that there is a rapid increase of residual noises from lag=1 to lag=30, but then the residual noises increase mildly. This trend is even clearer in FIG. 18B. We used a similarly defined quality factor as in eq. (20) to quantify the performance loss: $q_{Lag}=σ_{Lag}/σ_{Full}$. When lag=1, $q_{Lag}$ is exactly 1. From lag=1 to lag=2, $q_{Lag}$ increases to 1.015. It then increases with a steady slope until roughly lag=40 and tops off around lag=150. This loss of performance is expected because more low frequency fluctuations enter into B estimation with a larger lag, while we are trying to suppress the ΔI noise between consecutive shots. However, $q_{Lag}$ remains within 1.05 until around lag=20, which means the referencing performance is reasonably good within this range. Realistically lag=20 is very uncommon because most chopping or phase cycling patterns only involve a smaller number of consecutive shots, like 2-8. The value of $q_{Lag}$ is even closer to 1 with a smaller lag, although the number will depend on the specific experimental conditions, especially the laser repetition rate. For kilohertz laser systems, this kind of behavior should be typical.

For pump-probe experiments utilizing normal chopping, every other shot is a blank shot. Using an inconsistent ΔI definition, we can confidently use all the blanks shots to estimate B with ΔI lag=2 (difference between two consecutive blank shots) in Eq. (18) and apply B with ΔI lag=1 (difference between a signal shot and the subsequent blank shot) in Eq. (21). This method is very robust and does not require the insertion of additional blank shots. For more complex chopping patterns, B can be similarly estimated without any modification to the data collection scheme. For phase cycling, because all shots contain sample signal, adding a small percentage of blank shots is still necessary.

E. UV-Vis and Near-IR Wavelength with Silicon-Based Detectors

In this section we demonstrate our referencing method with Si-based CMOS array detectors for UV-Vis (white light continuum) and near-IR (femtosecond 800 nm, FWHM~15 nm) wavelengths. These detectors and light sources have several key differences from the MCT detectors and mid-IR light source discussed in the previous section, even though the referencing method remains the same. First, Si-based detector arrays typically have many more pixels than MCT detectors, which allows us to demonstrate all the advantages discussed in section 5A. Second, Si-based detectors have lower full-well capacity and dark noise than detectors, which gives a different fundamental noise floor (as discussed in section 5B). Finally, we demonstrate reference detection with a visible light source with a complex spectral correlation.

Figure 19:
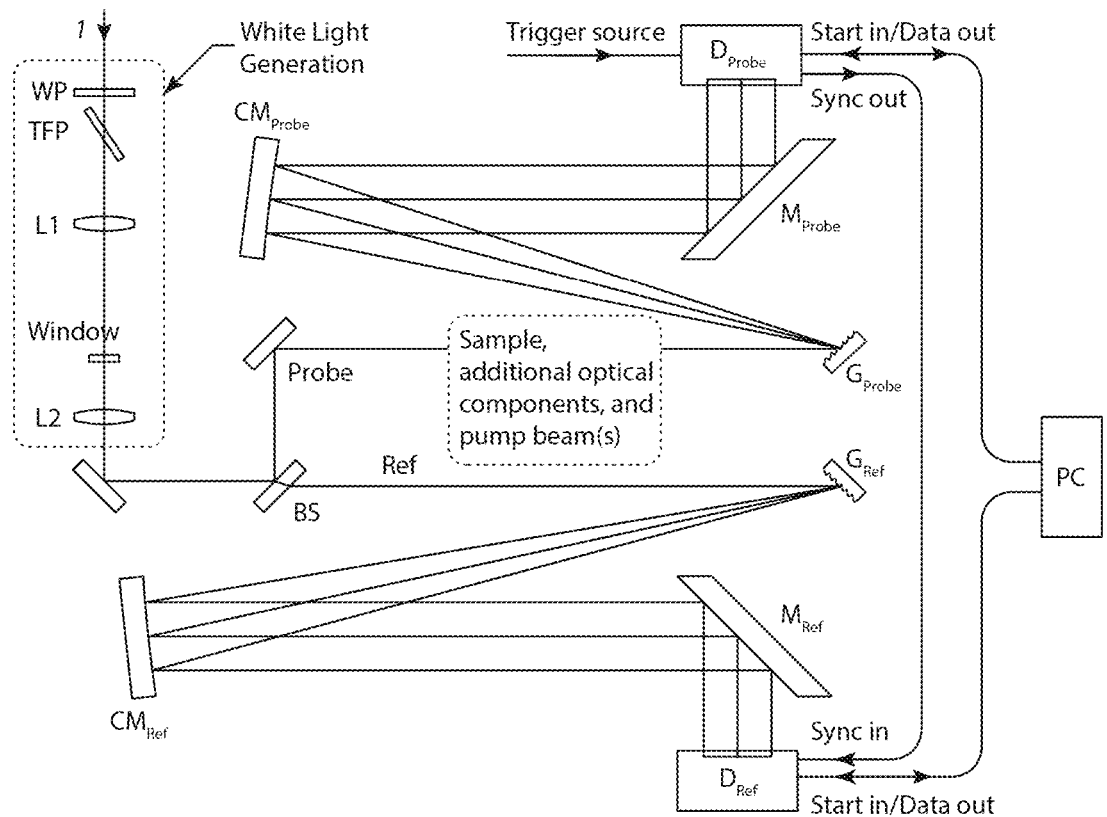
FIG. 19 is a schematic diagram of unmatched detection systems used to collect the near-IR and visible data according to an embodiment of the present invention.

A schematic diagram of the setup used to collect the 800 nm and white light continuum data in this section is shown in FIG. 19. Beam 1 is derived from a femtosecond pulsed 1 kHz 800 nm light source. An optional white light generation stage is used to generate the white light continuum data set with a sapphire window. The white light generation stage is composed of a waveplate (WP), thin film polarizer (TFP), f=125 mm concave lens (L1), a 3 mm thick sapphire window (Window), and a f=50 mm collimating lens (L2). The white light generation stage was removed when taking the 800 nm data set. The outgoing light is split by a beam splitter (BS) into the probe beam and reference beam. The probe beam can be optionally sent through a sample signal generation stage, although this stage was not present when taking the 800 nm and white light continuum data sets. The remaining probe is sent to the composite signal detection subsystem, which is composed of a grating $G_{Probe}$, f=250 mm concave mirror $CM_{Probe}$, steering mirror $M_{Probe}$, and $D_{Probe}$. $D_{Probe}$ is composed of a CMOS detector (Hamamatsu S10453-1024) and its associated electronics. The camera $D_{Probe}$ is triggered by an external trigger source that is synchronized to beam 1. Upon a start command from the computer, PC, $D_{Probe}$ generates a sync out trigger for every shot collected, which is used to trigger $D_{Ref}$ (after $D_{Ref}$ has received a start command from PC). $D_{Ref}$ is part of the composite reference detection subsystem, which additionally includes a grating, $G_{Ref}$, an f=300 concave mirror $CM_{Ref}$, and a steering mirror $M_{Ref}$. $D_{Ref}$ is composed of a CMOS detector (Hamamatsu S11639-01), and associated electronics As described above, we use two unmatched home-built spectrographs with CMOS arrays: a high well-depth detector, the Hamamatsu S10453-1024, as a signal array with 1024 pixels and a low well-depth detector, the Hamamatsu S11639-01, as a reference array with 2048 pixels. Both detectors are 16-bit with a maximum count of 65536. The spectrographs are designed to provide a similar spectral range for both detectors. The ratio of total light intensity entering the signal/reference spectrographs is approximately 21:1 for the 800 nm light. ~1 nJ of 800 nm light was used for the signal spectrograph. The 800 nm light is used directly from a Ti:Sapphire regenerative amplifier, while the white light continuum is generated by focusing ~1 μJ of 800 nm onto a sapphire window and collimating the outgoing continuum.

Figure 20:
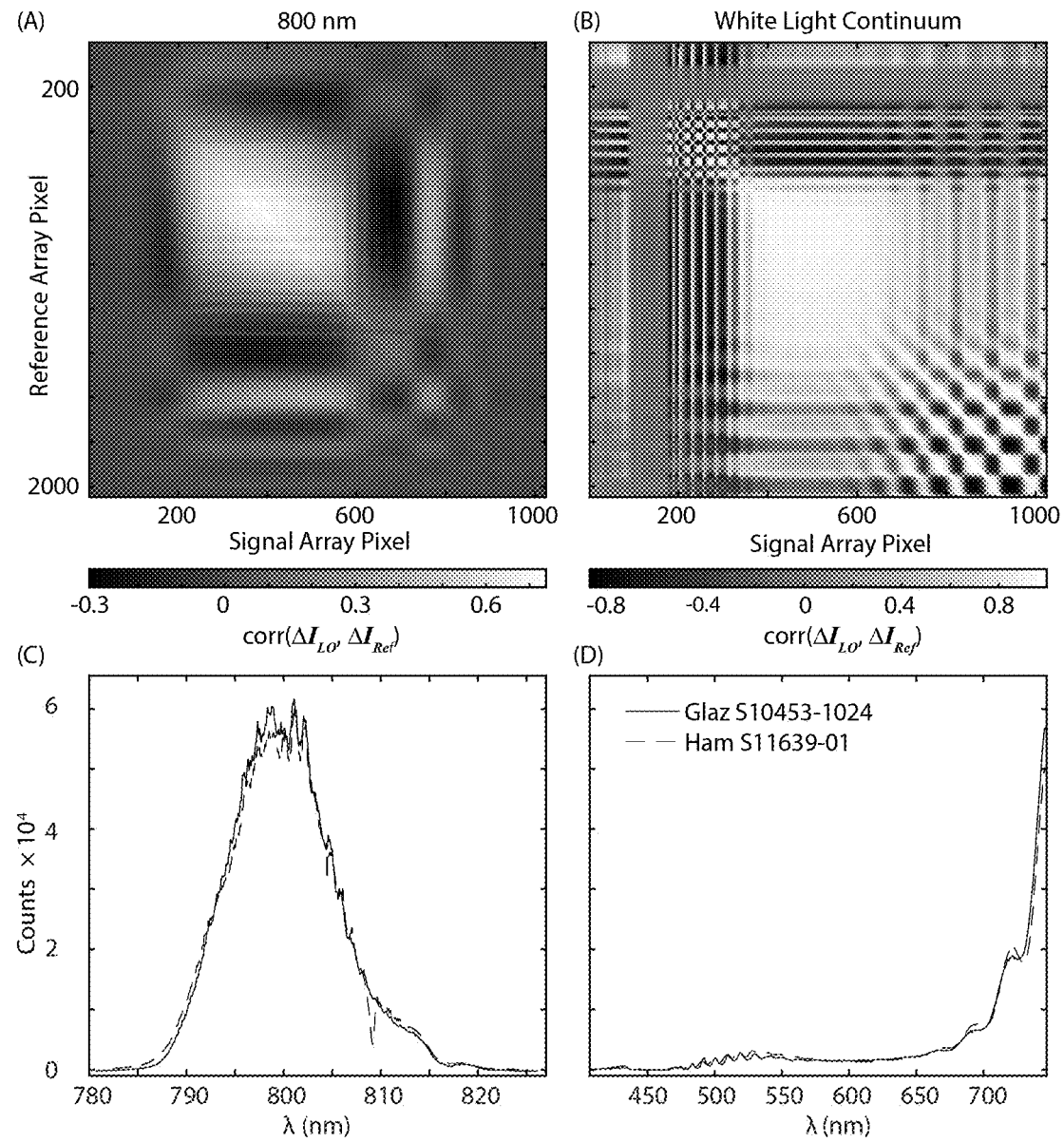
FIG. 20 are plots of spectral correlation and mean intensity for near IR and visible light according to embodiments of the present invention.

The temporal statistics for both the 800 nm and white light continuum light source show features similar to the mid-IR statistics shown in FIG. 5. FIGS. 20(A) and (B) show the spectral correlation of ΔI between the signal and reference arrays. The complex spectral correlation for the white light continuum in FIG. 20(B) likely arises from interference patterns of multifilament generation. The corresponding spectra are shown in FIG. 20(C) for 800 nm and FIG. 20(D) for the white light continuum. The intensity of both light sources on both detectors was around 90% of saturation. Note that the pixel numbering between the signal and reference detectors is flipped: the higher (lower) pixel number in the signal (reference) detector corresponds to higher wavelength. FIGS. 20(C) and (D) share the same legend.

Figure 21:
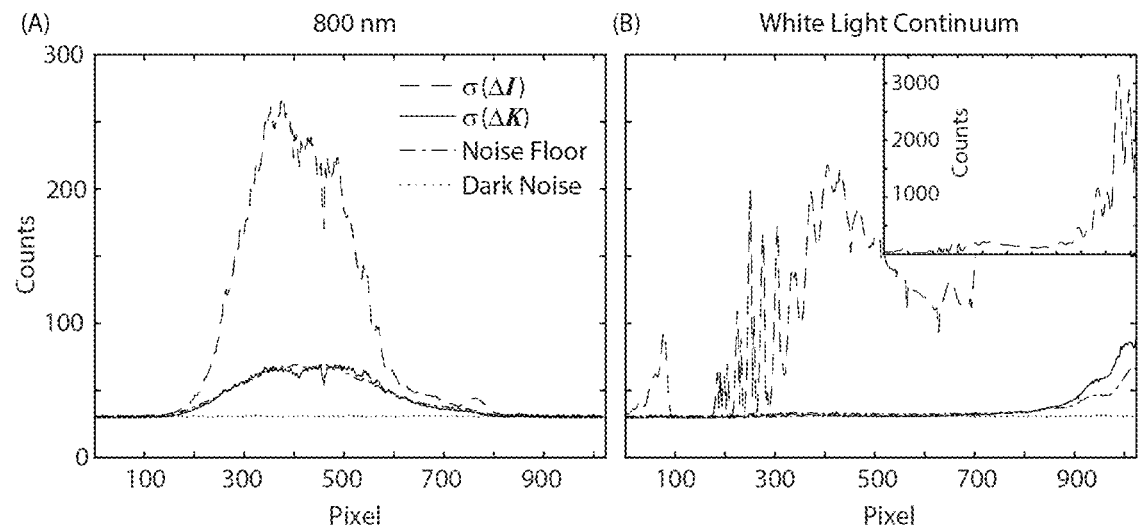
FIG. 21 are plots of $\Delta K$ noise for near IR and visible light for a high well-depth detector according to embodiments of the present invention.

FIG. 21 shows the reference performance for the 800 nm data set in FIG. 21(A) and the white light continuum data set in FIG. 21(B). The inset in FIG. 21(B) shows σ(ΔI) with a scaled y-axis. The noise floor is calculated from the RMS sum (of a shot pair) of the dark noise and photon shot noise assuming a full-well capacity 2M $e^-$ for the signal detector. Note that the noise floor largely overlaps with the ΔK line, indicating that the reference performance is down to the fundamental noise floor limit. Both panels share the same legend. All data sets used 60 k shots from both detectors and 30 k shot pairs to calculate B. For the 800 nm case in FIG. 21(A), the LO noise is reduced to the fundamental noise floor limit, which is dominated by photon shot noise. The SNR for the 800 nm data is approximately 1200 for a single shot. For the white light continuum, the reduced LO noise is close to the fundamental noise floor limit near the spectrum edge (where the intensity is highest) and corresponds to a maximum SNR of ~980. FIGS. 21(A)-(B) demonstrate that satisfactory noise suppression can be achieved by utilizing only 5% energy for reference detection.

Figure 22:
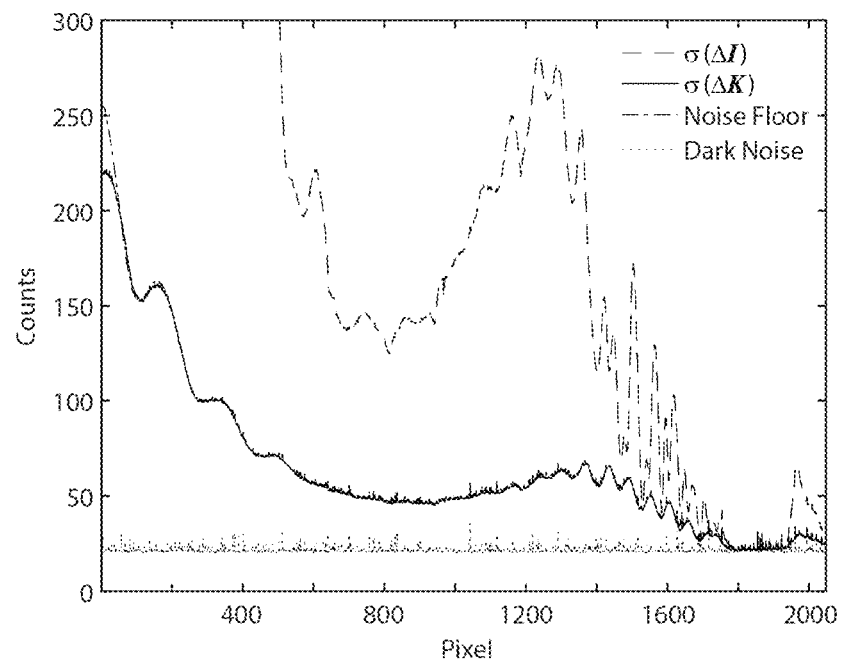
FIG. 22 is a plot of $\Delta K$ noise for visible light for a low well-depth detector according to an embodiment of the present invention.

FIG. 22 shows the reference performance for the white light continuum when the low well-depth detector (S11639-01) is used as the signal detector and the high well-depth detector (S10453-1024) is used as the reference detector. The noise floor is calculated the same way as in FIG. 21, but with an assumed full-well capacity of 100 k $e^-$. The noise floor largely overlaps with the ΔK line, indicating that the reference performance is down to the fundamental noise floor limit. Note that the fundamental noise floor limit is higher for S11639-01 (lower SNR), as compared to S10453-1024 in FIG. 21 (higher SNR). Although the LO noise is reduced to the fundamental noise floor limit, the maximum detector SNR is much lower at approximately 280. This clearly demonstrates the advantage of using a high well-depth detector as the signal detector, even when the LO noise is not fully suppressed to the fundamental noise floor limit.

F. Reference Pixel Data Compression

The introduction of high-pixel count reference detectors may come with the following costs: B calculation becomes computationally expensive, and not enough blank shots can be collected for a robust B estimation with a small percentage of blank shots and within a reasonable amount of time. These problems are easily mitigated because the different reference channels contain largely redundant information and may therefore be compressed into less reference channels. This is done through an extended definition of the reference channels:

$$\Delta I_{Ref}^{comp} \stackrel{def}{=} \Delta I_{Ref} C \qquad (31)$$

where C is a n×p matrix (p<n) that takes a linear combination of the original n reference channels of $\Delta I_{Ref}$ and maps them into p compressed reference channels, $\Delta I_{Ref}^{comp}$, of reduced dimensionality. $\Delta I_{Ref}^{comp}$ is then used in eq. (18) and (21).

Examples of reference pixel data compression include, but are not limited to, (i) binning and (ii) principal component analysis (PCA). These two methods demonstrate two different cases of data compression: the pixel binning case is computationally simple (and may be implemented in hardware), while the PCA case provides data compression that is more representative of the uncompressed data. In the case of pixel binning, C corresponds to a matrix that averages neighboring pixels. The number of neighboring pixels binned is not necessarily uniform across the detector array. For the PCA case, C corresponds to a matrix that is composed of the first p loadings for the original reference data set ($\Delta I_{Ref}$). The number of effective pixels is therefore the number of principal components used.

Figure 23:
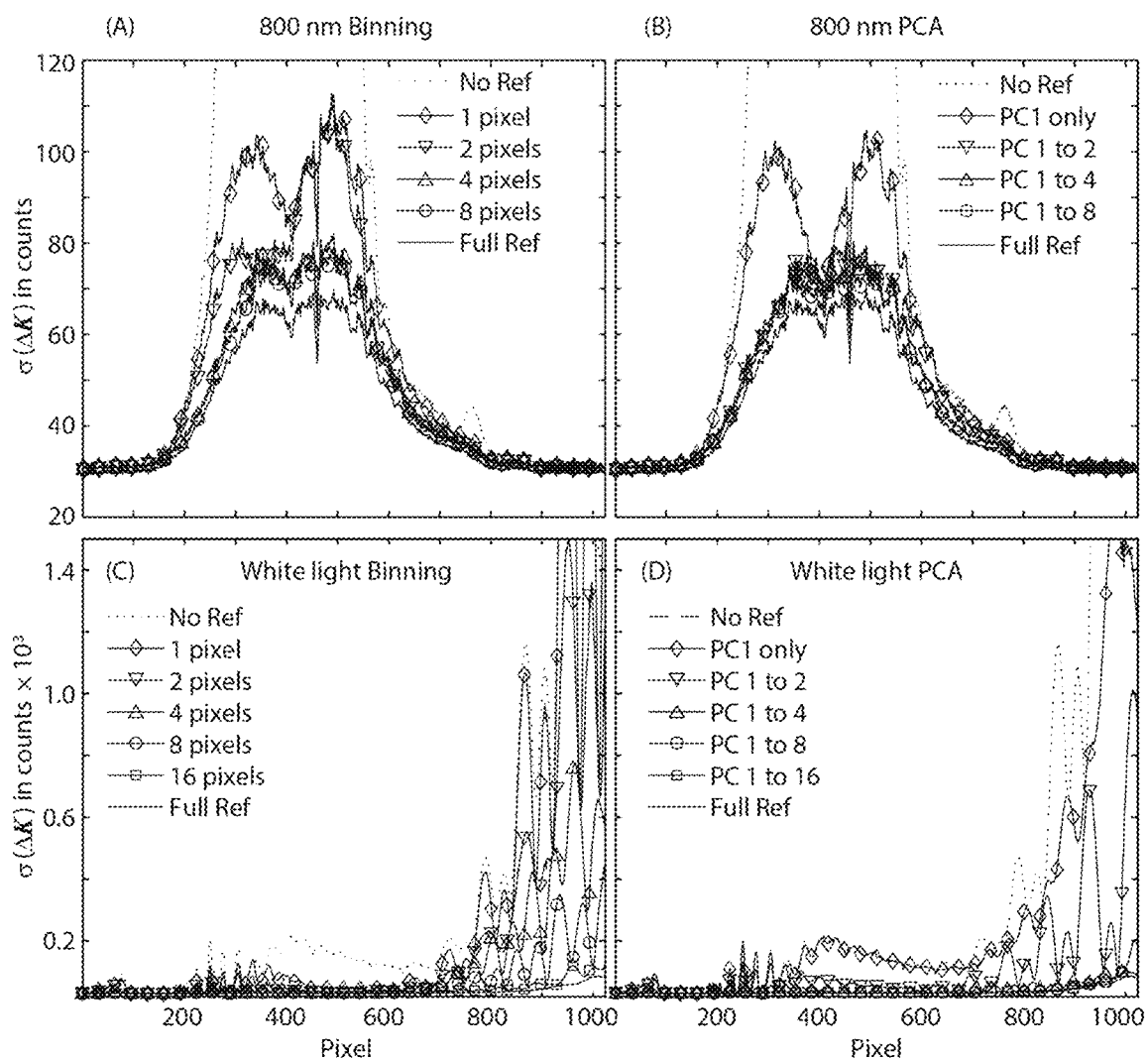
FIG. 23 are plots of $\Delta K$ noise for different reference data compression methods according to embodiments of the present invention.

We demonstrate the results of the two cases in FIG. 23 for the 800 nm light and white light continuum, which have very different reference channel correlation statistics. In FIGS. 23(A)-(D), B and $\sigma(\Delta K)$ are calculated from a compressed reference data set, where the compression results in an effective reduction of pixels. Results are shown for 800 nm light in FIGS. 23(A) and (B), and for the white light continuum in FIGS. 23(C) and (D). In the left column, FIGS. 23(A) and (C), the data compression corresponds to binning neighboring pixels. The data corresponds to the number of combined pixels left after binning; for example, 1 pixel is the same as a 1024-pixel bin and 2 pixels are the same as a 512-pixel bin. In the right column, FIGS. 23(B) and (D), data compression corresponds to a linear combination of pixels as found by PCA. The number, n, of compressed pixels corresponds to the first n principal components; for example, PC1 corresponds to one compressed pixel that is the first principle component of the reference data set, and PC1 to 2 corresponds to two compressed pixels that are the first and second principle components of the reference data set. For clarity, the vertical orderings of the legends and plotted data sets are the same In FIGS. 23(A) and (B), similar to the mid-IR case shown in FIG. 14(B), compressing reference data down to one pixel (diamond) shows some improvement over no referencing, but the $\Delta K$ noise is still far above the fundamental noise floor. Note that the solid lines shows the performance of full referencing, or referencing without data compression, which is close to the fundamental noise floor. In the two-pixel case (upside-down triangle), PCA shows some improvement over binning. With more pixels, both methods quickly converge, with PCA always slightly outperforming binning. In general, the use of PCA is not warranted when the reference channel correlation (not shown but is similar to FIG. 20(A)) is relatively simple.

The case is quite different for the white light continuum, FIGS. 23(C) and (D), which contains interference from multiple filaments and has a very complex reference channel correlation (not shown, but is similar to FIG. 20B)). With one compressed pixel (diamonds), the two methods perform relatively poorly. The binning case can effectively reduce $\Delta K$ noise where the reference channel correlation remains simple (in the middle of the spectrum) but fails completely at the edges of the spectrum. PCA reduces $\Delta K$ noise at the edges even for one pixel. With two compressed pixels (upside down triangle), PCA shows significant improvement, while binning shows small improvement at the spectrum edge. With four compressed pixels (right-side up triangle), the PCA performance converges to the performance seen with full referencing (solid line). Meanwhile binning shows some additional improvement near the spectrum edge but is still far from converged. This shows that, even with complex spectral correlation, the noise information in the reference channels can be effectively compressed down to four pixels via PCA. The small number of effective pixels makes it possible to refresh B frequently, which is important in applications like pump-probe and 2D-IR microscopy.

We conclude this section by noting that the exact method used for calculating C depends on the properties of the light source. Like B estimation in section 2C, C can also be periodically refreshed (e.g. in the case of PCA), although it does not have to be refreshed as often as B. Unlike B estimation, C is usually calculated from only the reference channel data. This means that all shots in $\Delta I_{Ref}$ can be used to calculate C, not just the blank shots, even when C is refreshed on-the-fly.

G. Reference Pixel Data Expansion

In some cases (discussed below) it is also preferable to expand the effective number of reference pixels by reference pixel data expansion. This method extends the $\Delta I_{Ref}$ definition as a concatenated row vector composed of $\Delta I_{Ref}$ and any higher order polynomial cross terms:

$$\Delta I_{Ref}^{expa} \stackrel{def}{=} (\Delta I_{Ref}, \Delta I_{Ref}^{(2)}, \Delta I_{Ref}^{(3)}, \ldots) \qquad (32)$$

Here, $\Delta I_{Ref}^{(2)}$ is any row vector composed of quadratic polynomial cross terms, explicitly written as $\Delta I_{Ref}^{(2)} = \Delta\{I_{Ref}(i) \cdot I_{Ref}(j)\}$. Similarly, $\Delta I_{Ref}^{(3)}$ is any row vector composed of cubic polynomial cross terms, explicitly written as $\Delta I_{Ref}^{(3)} = \Delta\{I_{Ref}(i) \cdot I_{Ref}(j) \cdot I_{Ref}(k)\}$ for $k \geq j \geq i$ up to the $n^{th}$ reference pixel. Any such higher order polynomial cross term can be included. It should be noted that all these terms are still zero-mean, so no background distortion is introduced when including them. Because $\Delta I_{Ref}^{expa}$ is composed of many more additional terms, it may be necessary to reduce its dimensionality before B calculation. This can be achieved by compressing Eq. (32) via Eq. (31).

Figure 24:
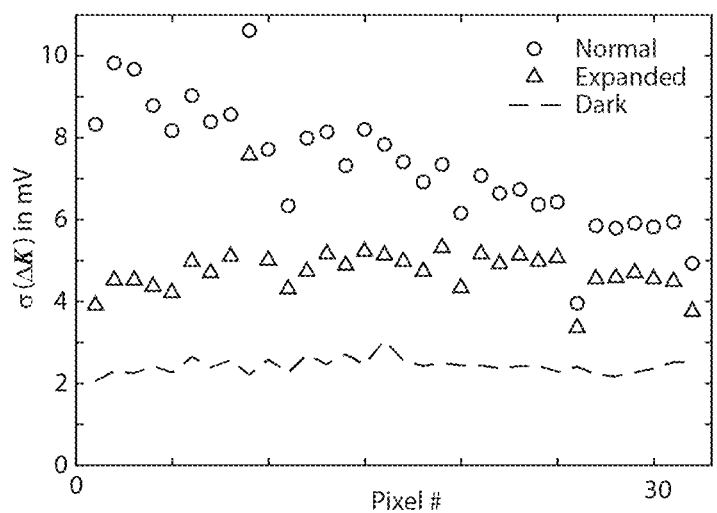
FIG. 24 is a plot of $\Delta K$ noise for pixel data expansion according to an embodiment of the present invention.

This method is useful in cases where merely using the normal $\Delta I_{Ref}$ does not achieve satisfactory performance. These cases include, but are not limited to, when the reference detector has high level of nonlinearity, the signal is detected after a frequency conversion stage (section 5H), or the reference channel count is too small. In FIG. 24, we show that reference pixel data expansion can provide approximately two times increase in SNR for a data set that is unusually noisy and is referenced with too few pixels. The expanded reference data set contains all 32 first order pixels that the normal reference data set has as well as the full set of 528 $2^{nd}$ order polynomial combinations. In this data set, the signal array is the top array of a 2×32 MCT detector, and the reference is the bottom array. This data set has an average (over all signal pixels) $\sigma(\Delta I)$ of 217 mV for 10 k data points.

H. Frequency Conversion and Optical Amplification

The new reference scheme detailed above removes the requirement of wavelength registry in conventional methods. However, in the above examples, the reference pixels are still detecting the same wavelength range as the signal pixels. It is possible to make the extension to the case where reference detection occurs at a totally different wavelength range. For example, the reference beam can undergo a nonlinear frequency conversion process before detection. This is especially meaningful in the mid-IR range where detector arrays are very expensive and the numbers of pixels are usually limited. By mixing with near-IR such as 800 nm light in a nonlinear crystal, the mid-IR can be upconverted to the visible where high performing, yet low cost, detector arrays are readily available.

The fundamental requirement for effective referencing is a high correlation R between the signal and reference pixels, as indicated by eq. (15). The upconversion process keeps the original information in the mid-IR light, which is why upconversion is already a popular technique to detect mid-IR. [28] However, reference detection with upconversion has not been done so far because detectors for different wavelength range cannot be matched by the conventional reference method. The nonlinear process also introduces some additional noises which cannot be minimized with the conventional method. With our new scheme, matching of detectors is unnecessary and the additional noises can be minimized by linear combination.

Figure 25:
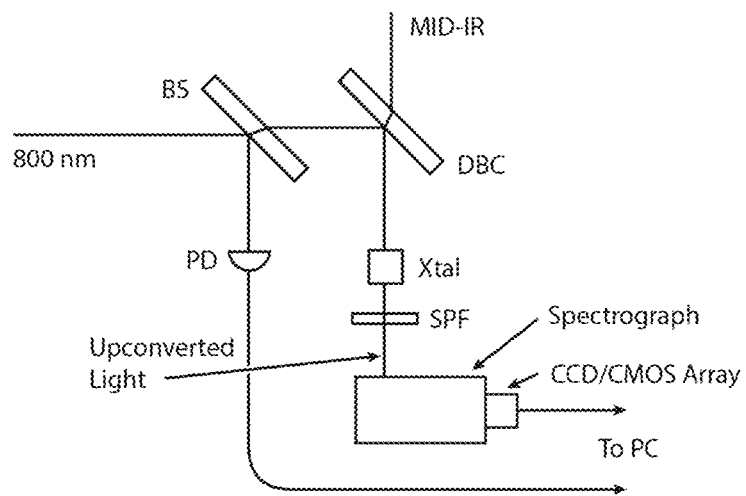
FIG. 25 is a schematic diagram of a composite detection system where an up-conversion stage is used before detection according to an embodiment of the present invention.

We give a schematic diagram of an upconversion detection setup in FIG. 25, where the 800 nm is monitored with a photodiode and the upconverted light is detected with a CMOS/CCD array behind a spectrograph. A small portion of narrowband or chirped pulse 800 nm light is split by a beam sampler (BS) and sent into a photodiode (PD). The resulting analog signal is amplified, digitized, and sent to a computer (PC) to be used as a reference channel. The remainder of the 800 nm light is combined with the mid-IR light to be detected (either reference, LO, or LO plus sample signal) using a dichroic beam combiner (DBC). The combined light is sent into a nonlinear crystal (Xtal) to be upconverted into visible light. A short pass filter (SPF) is used to filter out any remaining 800 nm and mid-IR light. The remaining upconverted visible light is sent into a spectrograph and the resulting spectrum is detected by a CCD/CMOS array. The resulting digital signal is sent to the PC. One or both of signal and reference detection systems can incorporate this setup to use Si-based detector array. In any case, the photodiode output is always treated as a reference pixel, and the array output (CCD/CMOS or MCT) in the reference detection system is also treated as the reference pixels. Similar ideas can be applied to the situation where an optical amplification stage, such as a fiber amplifier, is inserted prior to the detection system. [29] Our reference scheme can find the optimal coefficient matrix that relate the measurements on signal and reference detectors.

I. Various Realization of Detector Arrays

The virtual pixel in our scheme is a linear combination of all physical reference pixels that maximized the correlation R with the signal pixel. The reason a virtual pixel can surpass any physical pixel relies on the spectral correlation between different optical frequencies in a broadband source. A detector array can thus be defined as a device that can readout a spectrum within a single shot. Most commonly, it is realized by using a line array behind a spectrograph. But of course, the combination of any pixelated detector like a focal plane array, and any dispersive element like a virtually imaged phased array (VIPA), will serve this purpose. A special realization is to encode the frequency information onto the time axis through a dispersive fiber and to detect by a fast photodiode. [30] Although a single-pixel detector is used, it is effectively a detector array because the spectrum of a single shot can be recorded. Even several discrete photodiodes with different spectral response or filters can constitute the function.

In this section, we discussed the application scenarios of our new reference detection scheme. Since the detection systems discussed in this section can include various components including multiple detectors, different realizations of optical frequency analyzing devices, and even frequency conversion stages, they are appropriately termed as composite detection systems.

It should be understood, of course, that the foregoing relates to exemplary embodiments of the invention and that modifications may be made without departing from the spirit and scope of the invention as set forth in the following claims.

REFERENCES (1) Zhu, J.; Mathes, T.; Stahl, A. D.; Kennis, J. T. M.; Groot, M. L. *Opt. Express* 2012, 20, 10562.
(2) Werley, C. A.; Teo, S. M.; Nelson, K. A. *Rev. Sci. Instrum.* 2011, 82, 123108.
(3) Schriever, C.; Lochbrunner, S.; Riedle, E.; Nesbitt, D. J. *Rev. Sci. Instrum.* 2008, 79, 013107.
(4) Bizimana, L. A.; Brazard, J.; Carbery, W. P.; Gellen, T.; Turner, D. B. *J. Chem. Phys.* 2015, 143, 164203.
(5) Brazard, J.; Bizimana, L. A.; Turner, D. B. *Rev. Sci. Instrum.* 2015, 86, 053106.
(6) Dobryakov, A. L.; Kovalenko, S. A.; Weigel, A.; Pérez-Lustres, J. L.; Lange, J.; Müller, A.; Ernsting, N. P. *Rev. Sci. Instrum.* 2010, 81, 113106.
(7) Bradler, M.; Riedle, E. *J. Opt. Soc. Am. B* 2014, 31, 1465.
(8) Hamm, P.; Wiemann, S.; Zurek, M.; Zinth, W. *Opt. Lett.* 1994, 19, 1642.
(9) Kaucikas, M.; Barber, J.; Van Thor, J. J. *Opt. Express* 2013, 21, 8357.
(10) Moon, S.; Kim, D. Y. *Opt. Express* 2007, 15, 15129.
(11) Black, A. J.; Akkin, T. *Appl. Opt.* 2015, 54, 7252.
(12) Bo, E.; Liu, X.; Chen, S.; Yu, X.; Wang, X.; Liu, L. *Opt. Express* 2015, 23, 28050.
(13) Abbas, G. L.; Chan, V. W. S.; Yee, T. K. *Opt. Lett.* 1983, 8, 419.
(14) Mukamel, S. *Principles of Nonlinear Optical Spectroscopy*; Oxford University Press: Oxford, U.K., 1999.
(15) Röttger, K.; Wang, S.; Renth, F.; Bahrenburg, J.; Temps, F. *Appl. Phys. B* 2015, 118, 185.
(16) Auböck, G.; Consani, C.; Monni, R.; Cannizzo, A.; Mourik, F. v.; Chergui, M. *Rev. Sci. Instrum.* 2012, 83, 093105.
(17) Megerle, U.; Pugliesi, I.; Schriever, C.; Sailer, C. F.; Riedle, E. *Appl. Phys. B* 2009, 96, 215.
(18) Polli, D.; Lüer, L.; Cerullo, G. *Rev. Sci. Instrum.* 2007, 78, 103108.
(19) Anderson, K. E. H.; Sewall, S. L.; Cooney, R. R.; Kambhampati, P. *Rev. Sci. Instrum.* 2007, 78, 073101.
(20) Luther, B. M.; Tracy, K. M.; Gerrity, M.; Brown, S.; Krummel, A. T. *Opt. Express* 2016, 24, 4117.
(21) Sul, S.; Karaiskaj, D.; Jiang, Y.; Ge, N.-H. *J. of Phys. Chem. B* 2006, 110, 19891.
(22) Shim, S.-H.; Strasfeld, D. B.; Zanni, M. T. *Opt. Express* 2006, 14, 13120.
(23) Moon, J. A. *Rev. Sci. Instrum.* 1993, 64, 1775.
(24) Kanal, F.; Keiber, S.; Eck, R.; Brixner, T. *Opt. Express* 2014, 22, 16965.
(25) Li, Y.-q.; Guzun, D.; Xiao, M. *Phys. Rev. Lett.* 1999, 82, 5225.
(26) Wieser, W.; Draxinger, W.; Klein, T.; Karpf, S.; Pfeiffer, T.; Huber, R. *Biomed. Opt. Express* 2014, 5, 2963.
(27) Holmes, J. F.; Rask, B. J. *Appl. Opt.* 1995, 34, 927.

(28) Nee, M. J.; McCanne, R.; Kubarych, K. J.; Joffre, M. *Opt. Lett.* 2007, 32, 713.
(29) Solli D. R.; Jalali, B. *Nat. Photonics.* 2008, 2, 48.
(30) Goda, K.; Jalali, B. *Nat. Photonics.* 2013, 7, 102.

We claim:

1. A heterodyne optical spectroscopy system, comprising:
   a beam blocker that turns off a sample signal to generate signal shots and blank shots of the sample signal;
   a signal detection subsystem that detects the sample signal and a portion of local oscillator (LO);
   wherein the reference detection subsystem detects another portion of the LO; and
   a controller in communication with the beam modulator, the signal detection subsystem, and the reference detection subsystem;
   wherein the controller:
     causes the system to acquire the signal shots and the blanks shots on both the reference detection subsystem and the signal detection subsystem;
     uses the blank shots to find a linear combination coefficient matrix that reconstructs noise characteristics of the signal detection subsystem from the reference detection subsystem;
     suppresses additive noise, in the system, by a subtraction method.

2. The system of claim 1, wherein the beam blocker generates at least two consecutive blank shots between a plurality of signal shots.

3. The system of claim 1, wherein the beam blocker is a mechanical chopper wheel.

4. The system of claim 1, further comprising an amplitude/phase modulator that changes an amplitude and/or a phase of the sample signal, wherein the modulator is a component of the system physically separate from the beam blocker.

5. The system of claim 1, wherein the beam blocker includes an amplitude/phase modulator that changes an amplitude and/or a phase of the sample signal.

6. The system of claim 1, further comprising a first beam splitter that splits the LO into a probe beam for receipt by the signal detector and into a reference beam for receipt by the reference detector.

7. The system of claim 6, further comprising:
   a second beam splitter that combines a signal beam with the probe beam for receipt by the signal detector;
   wherein the signal detector includes a first detector and a second detector.

* * * * *